US012499819B2

(12) United States Patent
Jang et al.

(10) Patent No.: US 12,499,819 B2
(45) Date of Patent: Dec. 16, 2025

(54) GATE DRIVING CIRCUIT AND DISPLAY DEVICE INCLUDING THE SAME

(71) Applicant: LG Display Co., Ltd., Seoul (KR)

(72) Inventors: Min June Jang, Paju-si (KR); Hong Jae Shin, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/891,955

(22) Filed: Sep. 20, 2024

(65) Prior Publication Data

US 2025/0239210 A1 Jul. 24, 2025

(30) Foreign Application Priority Data

Jan. 24, 2024 (KR) ........................ 10-2024-0011052

(51) Int. Cl.
*G09G 3/32* (2016.01)
*G09G 3/3208* (2016.01)
(Continued)

(52) U.S. Cl.
CPC ............ *G09G 3/32* (2013.01); *G09G 3/3208* (2013.01); *G09G 3/3266* (2013.01); *G09G 3/3674* (2013.01); *G09G 2300/0842* (2013.01); *G09G 2300/0861* (2013.01); *G09G 2310/02* (2013.01); *G09G 2310/0202* (2013.01); *G09G 2310/0267* (2013.01); *G09G 2310/0283* (2013.01); *G09G 2310/0286* (2013.01); *G09G 2310/08* (2013.01); *G09G 2320/043* (2013.01)

(58) Field of Classification Search
CPC ...... G09G 3/32; G09G 3/3208; G09G 3/3266; G09G 3/3674; G09G 2300/0842; G09G 2300/0861; G09G 2310/02; G09G 2310/0202; G09G 2310/0267; G09G 2310/0283; G09G 2310/0286; G09G 2310/08; G09G 2320/043
USPC .......................................................... 345/206
See application file for complete search history.

(56) References Cited

U.S. PATENT DOCUMENTS 8,836,633 B2 * 9/2014 Tsai ......................... G09G 3/20
345/100
10,891,903 B2 * 1/2021 Takasugi .............. G09G 3/3225
(Continued)

FOREIGN PATENT DOCUMENTS

KR 10-2019-0056671 A 5/2019
KR 10-2019-0069182 A 6/2019

*Primary Examiner* — Jason M Mandeville
(74) *Attorney, Agent, or Firm* — Birch, Stewart, Kolasch & Birch, LLP

(57) ABSTRACT

A display device can include a display panel with a plurality of sub-pixels disposed therein, and a gate driving circuit configured to output a gate signal to the plurality of sub-pixels. The gate driving circuit includes a pull-up transistor controlled by a voltage level of a Q-node, a pull-down transistor configured by a voltage level of a QB-node, a dual carry circuit configured to output a forward carry signal in accordance with the voltage levels of the Q-node and the QB-node in forward driving and output a backward carry signal in accordance with the voltage levels of the Q-node and the QB-node in backward driving, and a clock input circuit configured to apply a forward clock signal to the Q-node when a forward start signal is input and apply a backward clock signal to the Q-node when a backward start signal is input.

16 Claims, 20 Drawing Sheets

(51) Int. Cl.
*G09G 3/3266* (2016.01)
*G09G 3/36* (2006.01)

(56) References Cited

U.S. PATENT DOCUMENTS

| | | | | |
|---|---|---|---|---|
| 2012/0188211 | A1* | 7/2012 | Tsai | G09G 3/20 345/205 |
| 2016/0042691 | A1* | 2/2016 | Na | G11C 19/28 345/82 |
| 2019/0189060 | A1* | 6/2019 | Takasugi | G09G 3/3275 |
| 2022/0208130 | A1* | 6/2022 | Park | G09G 3/3291 |

* cited by examiner

EQ Node Simulation Waveform

EM Output Simulation Waveform

GATE DRIVING CIRCUIT AND DISPLAY DEVICE INCLUDING THE SAME

CROSS-REFERENCE TO RELATED APPLICATIONS

This application claims priority to Korean Patent Application No. 10-2024-0011052, filed in the Republic of Korea on Jan. 24, 2024, the entire contents of which is hereby expressly incorporated by reference into the present application.

BACKGROUND OF THE INVENTION

Field of the Invention

The present disclosure relates to a gate driving circuit and a display device including the same.

Discussion of the Related Art

A display device can include a plurality of sub-pixels disposed at a panel, and various circuits configured to drive the plurality of sub-pixels. For example, the display device can include a gate driving circuit configured to control driving timing of the plurality of sub-pixels, and a data driving circuit configured to supply a data voltage corresponding to image data to the plurality of sub-pixels.

Such driving circuits of the display device can be configured through inclusion of a plurality of switches. Such switches can be degraded as driving times thereof elapse. In particular, in the case of a switch included in a circuit having a high use frequency, degradation thereof can more early occur. As a result, the lifespan of the resultant display device can be reduced.

SUMMARY OF THE INVENTION

Accordingly, the present disclosure is directed to a gate driving circuit and a display device including the same that substantially obviate one or more problems due to limitations and disadvantages of the related art.

The aspects of the present disclosure provide a gate driving circuit capable of reducing or preventing degradation thereof which may be caused by extended driving thereof, and a display device including the gate driving circuit.

Objects of the present disclosure are not limited to the above-described objects, and other objects of the present disclosure not yet described will be more clearly understood by those skilled in the art from the following detailed description.

To achieve these objects and other advantages and in accordance with the purpose of the disclosure, as embodied and broadly described herein, a display device includes a display panel having a plurality of sub-pixels disposed therein, and a gate driving circuit configured to output a gate signal to the plurality of sub-pixels, wherein the gate driving circuit includes a pull-up transistor controlled by a voltage level of a Q-node, a pull-down transistor configured by a voltage level of a QB-node, a dual carry circuit configured to output a forward carry signal in accordance with the voltage levels of the Q-node and the QB-node in forward driving thereof and output a backward carry signal in accordance with the voltage levels of the Q-node and the QB-node in backward driving thereof, and a clock input circuit configured to apply a forward clock signal to the Q-node when a forward start signal is input thereto and apply a backward clock signal to the Q-node when a backward start signal is input thereto.

According to aspects of the present disclosure, the dual carry circuit can include a first pull-up carry transistor controlled by the voltage level of the Q-node, thereby outputting the forward carry signal, a second pull-up carry transistor controlled by the voltage level of the Q-node, thereby outputting the backward carry signal, a first pull-down carry transistor controlled by the voltage level of the QB-node, thereby outputting the forward carry signal, and a second pull-down carry transistor controlled by the voltage level of the QB-node, thereby outputting the backward carry signal.

According to aspects of the present disclosure, the first pull-up carry transistor can be controlled by the voltage level of the Q-node, thereby outputting a forward low voltage as the forward carry signal.

According to aspects of the present disclosure, the first pull-down carry transistor can be controlled by the voltage level of the QB-node, thereby outputting a backward low voltage as the backward carry signal.

According to aspects of the present disclosure, the clock input circuit can include a first transistor circuit configured to apply the forward clock signal to the Q-node when the forward start signal is input thereto, and a second transistor circuit configured to apply the backward clock signal to the Q-node when the backward start signal is input thereto.

According to aspects of the present disclosure, the first transistor circuit can include at least one transistor, and the at least one transistor can include a gate to which the forward start signal is input, a drain to which the forward clock signal is input, and a source connected to the Q-node.

According to aspects of the present disclosure, the second transistor circuit can include at least one transistor, and the at least one transistor can include a gate to which the backward start signal is input, a drain to which the backward clock signal is input, and a source connected to the Q-node.

According to aspects of the present disclosure, the gate driving circuit can further include a Q-node discharging circuit configured to discharge the Q-node in accordance with the forward clock signal when the forward start signal is input at an off level in the forward driving, and discharge the Q-node in accordance with the backward clock signal when the backward start signal is input at an off level in the backward driving.

According to aspects of the present disclosure, the Q-node discharging circuit can include a third transistor configured to apply a high drive voltage in accordance with a gate input voltage input thereto at a turn-on level, a fourth transistor configured to apply the gate input voltage of the turn-on level to the third transistor when the forward start signal is input thereto at an off level in the forward driving, and a fifth transistor configured to discharge the Q-node at the high drive voltage applied by the third transistor in accordance with the forward clock signal.

According to aspects of the present disclosure, the Q-node discharging circuit can include a third transistor configured to apply a high drive voltage in accordance with a gate input voltage input thereto at a turn-on level, a fourth transistor configured to apply the gate input voltage of the turn-on level to the third transistor when the backward start signal is input thereto at an off level in the backward driving, and a fifth transistor configured to discharge the Q-node at the high drive voltage applied by the third transistor in accordance with the backward clock signal.

According to aspects of the present disclosure, the display panel can include a substrate at which the gate driving circuit is formed at least one in number among pixel areas formed with the plurality of sub-pixels.

According to aspects of the present disclosure, each of the plurality of sub-pixels can include a light emitting element, a driving transistor configured to supply a drive current to the light emitting element, and a plurality of switching transistors configured to control driving timings of the driving transistor and the light emitting element, and the gate signal can be supplied to control, among the plurality of plurality of switching transistor, a switching transistor configured to control a turn-on period of the light emitting element.

In another aspect of the present disclosure, a gate driving circuit includes a pull-up transistor controlled by a voltage level of a Q-node and electrically connected between an input terminal for a low drive voltage and an output terminal for a gate signal, a pull-down transistor controlled by a voltage level of a QB-node and electrically connected between an input terminal for a high drive voltage and the output terminal for the gate signal, a first pull-up carry transistor controlled by the voltage level of the Q-node and electrically connected between an input terminal for a forward low drive voltage and an output terminal for a forward carry signal, a second pull-up carry transistor controlled by the voltage level of the Q-node and electrically connected between an input terminal for a backward low drive voltage and an output terminal for a backward carry signal, a first pull-down carry transistor controlled by the voltage level of the QB-node and electrically connected between the input terminal for the high drive voltage and the output terminal for the forward carry signal, and a second pull-down carry transistor controlled by the voltage level of the QB-node and electrically connected between the input terminal for the high drive voltage and the output terminal for the backward carry signal.

According to aspects of the present disclosure, the gate driving circuit can further include a clock input circuit including a first transistor circuit configured to apply the forward clock signal to the Q-node when a forward start signal is input thereto, and a second transistor circuit configured to apply the backward clock signal to the Q-node when a backward start signal is input thereto.

According to aspects of the present disclosure, the first transistor circuit can include at least one transistor, and the transistor can include a gate to which the forward start signal is input, a drain to which the forward clock signal is input, and a source connected to the Q-node.

According to aspects of the present disclosure, the second transistor circuit can include at least one transistor, and the transistor can include a gate to which the backward start signal is input, a drain to which the backward clock signal is input, and a source connected to the Q-node.

According to aspects of the present disclosure, the gate driving circuit can further include a Q-node discharging circuit configured to discharge the Q-node in accordance with the forward clock signal when the forward start signal is input at an off level in the forward driving, and discharge the Q-node in accordance with the backward clock signal when the backward start signal is input at an off level in the backward driving.

According to aspects of the present disclosure, the Q-node discharging circuit can include a third transistor configured to apply a high drive voltage in accordance with a gate input voltage input thereto at a turn-on level, a fourth transistor configured to apply the gate input voltage of the turn-on level to the third transistor when the forward start signal is input thereto at an off level in the forward driving, and a fifth transistor configured to discharge the Q-node at the high drive voltage applied by the third transistor in accordance with the forward clock signal.

BRIEF DESCRIPTION OF THE DRAWINGS

The accompanying drawings, which are included to provide a further understanding of the disclosure and are incorporated in and constitute a part of this application, illustrate aspect(s) of the disclosure and along with the description serve to explain the principle of the disclosure. In the drawings.

DETAILED DESCRIPTION OF THE EMBODIMENTS

Figure 1:
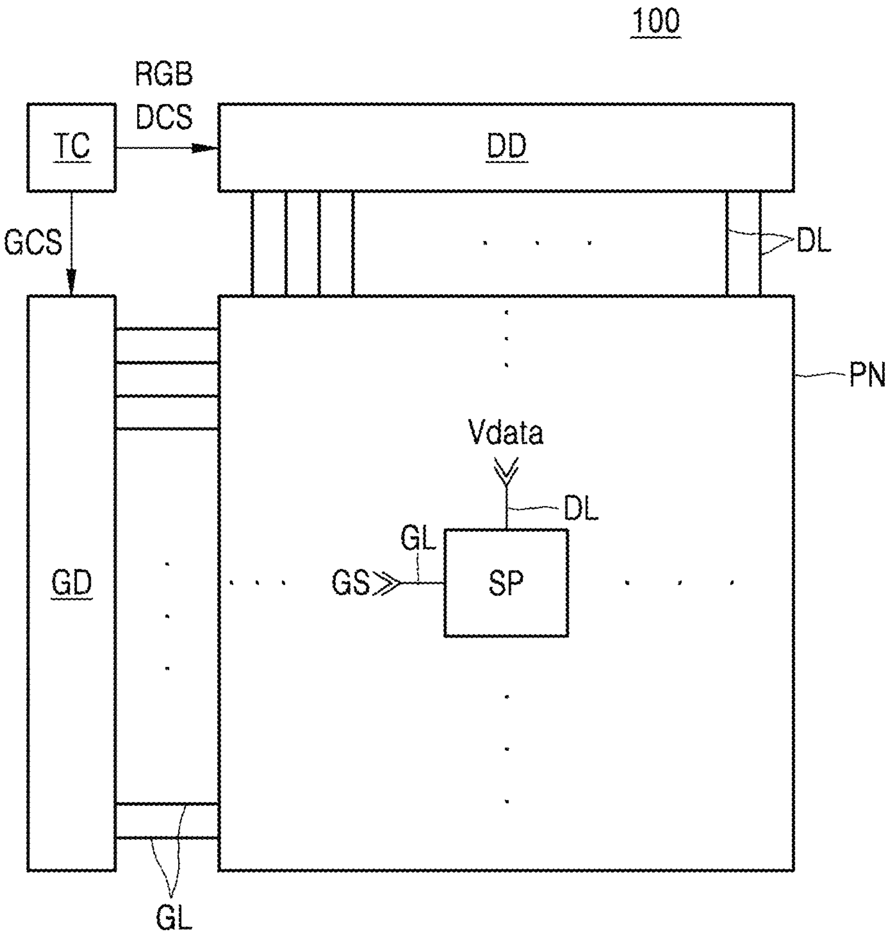
FIG. 1 is a schematic configuration diagram of a display device according to aspect(s) of the present disclosure.

Advantages and features of the present disclosure and methods for achieving the same will be made clear from aspects described below in detail with reference to the accompanying drawings. The present disclosure may, however, be embodied in many different forms, and should not be construed as being limited to the aspects set forth herein. Here, aspects of the present disclosure are provided so that the present disclosure can be sufficiently thorough and complete to assist those skilled in the art in fully understanding the scope of the present disclosure.

The shape, size, ratio, angle, number and the like shown in the drawings to illustrate the aspects of the present disclosure are only for illustration and are not limited to the contents shown in the drawings. Wherever possible, the same reference numbers will be used throughout the drawings to refer to the same or like parts. In the following description, detailed descriptions of technologies or configurations related to the present disclosure can be omitted so as not to unnecessarily obscure the subject matter of the present disclosure. When terms such as "including", "having" and "comprising" are used throughout the disclosure, an additional component can be present, unless "only" is used. A component described in a singular form encompasses components in a plural form unless particularly stated otherwise.

It should be interpreted that the components included in the aspect(s) of the present disclosure include an error range, although there is no additional particular description thereof.

In describing a variety of aspects of the present disclosure, when terms for positional relationship such as "on", "above", "under" and "next to" are used, at least one intervening element can be present between two elements unless "immediately" or "directly" is used. Further, the term "can" fully encompasses all the meanings and coverages of the term "may."

In the meantime, although terms including an ordinal number, such as first or second, can be used to describe a variety of constituent elements, the constituent elements are not limited to the terms, and the terms are used only for the purpose of discriminating one constituent element from other constituent elements. For example, without departing from the scope of the present disclosure, a first constituent element can be named a second constituent element.

In addition, a pixel circuit of a display device, which will be described hereinafter, can include a plurality of transistors. Such transistors can be implemented by an oxide thin film transistor (TFT) including an oxide semiconductor, a low-temperature polysilicon (LTPS) TFT including LTPS, etc. Each of such transistors can be implemented by a p-channel TFT or an n-channel TFT.

Such a transistor is a three-electrode element including a gate, a source, and drain. The source is an electrode configured to supply carriers to the transistor. In the transistor, carriers flow from the source. The drain is an electrode configured to allow carriers in the transistor to be discharged to an outside of the transistor. Flow of carriers in the transistor proceeds from the source to the drain. In an n-channel transistor, carriers are electrons and, as such, a source voltage is lower than a drain voltage in order to enable electrons to flow from the source to the drain. The direction of current in the n-channel transistor proceeds from the drain to the source. In a p-channel transistor (for example, a PMOS transistor), carriers are holes and, as such, a source voltage is higher than a drain voltage in order to enable holes to flow from the source to the drain. In the p-channel transistor, current flows from the source to the drain because holes flow from the source to the drain. Here, it should be noted that the source and the drain in the transistor are not fixed. For example, the source and the drain can be interchanged in accordance with an application voltage. Accordingly, the present disclosure is not limited due to the source and the drain of the transistor. In the following description, the source and the drain of the transistor will be referred to as first and second electrodes.

A gate signal swings between a gate-on voltage and a gate-off voltage. The gate-on voltage is set to a voltage higher than a threshold voltage of a transistor, and the gate-off voltage is set to a voltage lower than the threshold voltage of the transistor. The transistor is turned on in response to the gate-on voltage, and is turned off in response to the gate-off voltage. In an n-channel transistor, the gate-on voltage can be a gate-high voltage VGH, and the gate-off voltage can be a gate-low voltage VGL. In a p-channel transistor, the gate-on voltage can be the gate-low voltage VGL, and the gate-off voltage can be the gate-high voltage VGH.

Throughout the disclosure, the same reference numerals designate the same constituent elements, respectively. The area and thickness of each constituent element shown in the accompanying drawings are illustrated for convenience of description, and the present disclosure is not limited to the illustrated area and thickness of the constituent element.

The respective features of various aspects according to the present disclosure can be partially or entirely joined or combined and technically variably related or operated, and the aspects can be implemented independently or in combination.

Hereinafter, aspects of the present disclosure will be described in detail with reference to the accompanying drawings. All the components of each display device according to all aspects and embodiments of the present disclosure are operatively coupled and configured. In the following description of the present disclosure, a detailed description of known functions and configurations incorporated herein will be omitted when it can obscure the subject matter of the present disclosure.

FIG. 1 is a schematic configuration diagram of a display device according to aspect(s) of the present disclosure.

For convenience of description, FIG. 1 shows a display panel PN, a gate driver GD, a data driver DD, and a timing controller TC, among various constituent elements of a display device 100. Positions of the display panel PN, the gate driver GD, the data driver DD, and the timing controller TC are only positions given for convenience of illustration, and can be varied.

Referring to FIG. 1, the display device 100 includes the display panel PN, which includes a plurality of sub-pixels SP, the gate driver GD and the data driver DD, which are configured to supply various signals to the display panel PN, and the timing controller TC, which is configured to control the gate driver GD and the data driver DD.

The display panel PN has a configuration for displaying an image to the user, and includes the plurality of sub-pixels SP. In the display panel PN, a plurality of gate lines GL and a plurality of data lines DL intersect each other, and each of the plurality of sub-pixels SP is connected to corresponding ones of the gate lines SL and the data lines DL. In addition, each of the plurality of sub-pixels SP can be connected to power lines such as a high-level power line, a low-level power line, a reference power line, etc.

Each of the plurality of sub-pixels SP is a minimum unit of a configuration constituting a screen. Each of the plurality of sub-pixels SP includes a light emitting element, and a sub-pixel circuit configured to drive the light emitting element. A plurality of light emitting elements can be defined to have different types in accordance with different kinds of the display panel PN. For example, when the display panel PN is an inorganic light emitting display panel, each light emitting element can be a light emitting diode (LED) or a micro-light emitting diode (micro-LED).

The gate driver GD supplies a plurality of gate signals GS to the plurality of gate lines GL in accordance with a plurality of gate control signals GCS supplied from the timing controller TC. Although the gate driver GD is shown in FIG. 1 as being disposed at one side of the display panel PN as a single block while being spaced apart from the side of the display panel PN, the number and disposition of the gate driver GD are not limited thereto.

The data driver DD converts image data RGB input thereto from the timing controller TC into a data voltage Vdata, using a reference gamma voltage, in accordance with a plurality of data control signals DCS supplied from the timing controller TC. The data driver DD can supply the converted data voltage Vdata to the plurality of data lines DL.

The timing controller TC arranges the image data RGB input thereto from an outside thereof, and supplies the arranged image data RGB to the data driver DD. The timing controller TC can generate the gate control signal GCS and the data control signal DCS using synchronization signals input thereto from the outside thereof, for example, a dot clock signal, a data enable signal, and horizontal/vertical synchronization signals.

The timing controller TC supplies the gate control signal GCS and the data control signal DCS generated as described above to the gate driver GD and the data driver DD, respectively, thereby controlling the gate driver GD and the data driver DD.

Hereinafter, a configuration of the display panel PN of the display device 100 according to aspects of the present disclosure will be described in more detail.

Figure 2:
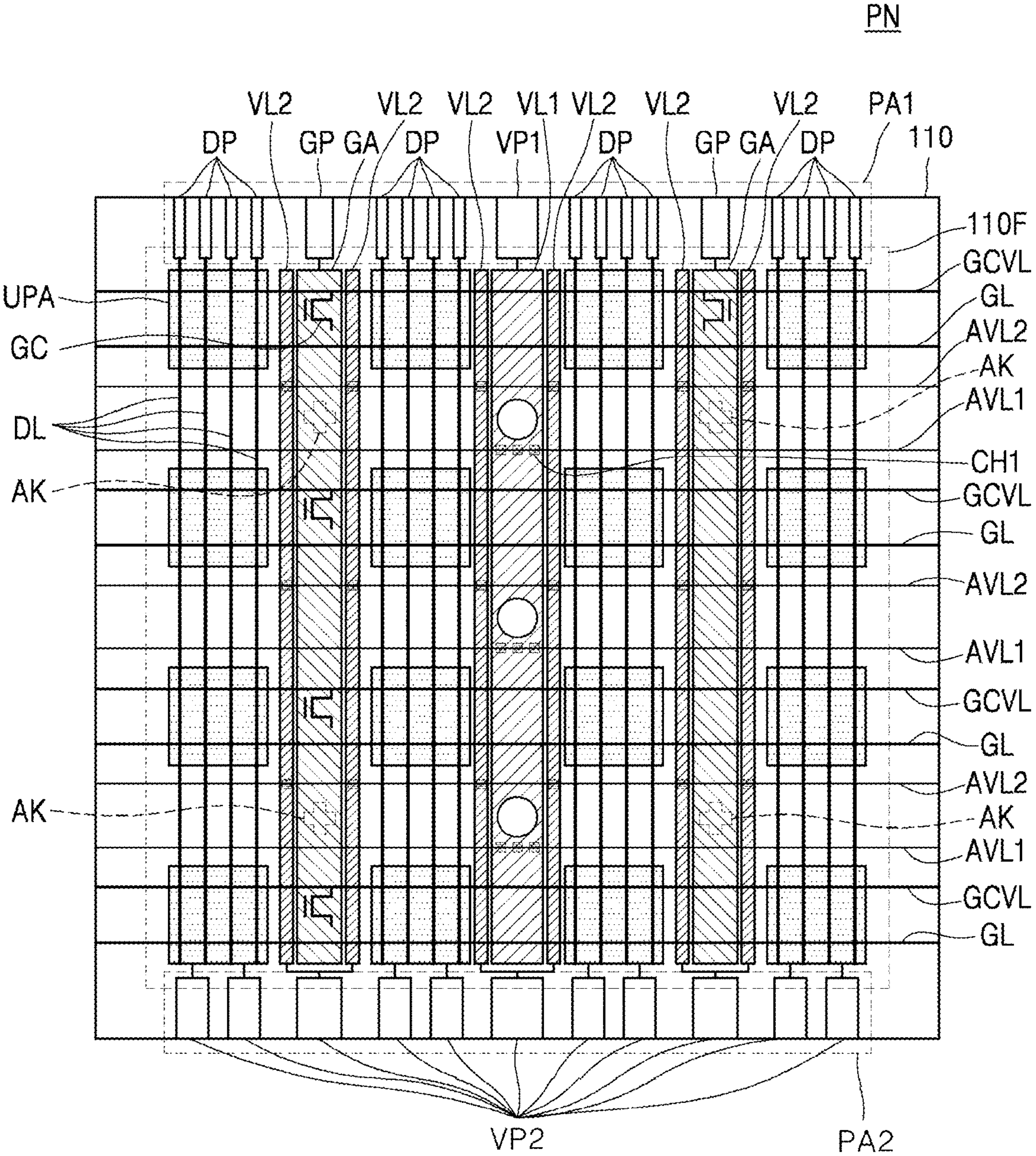
FIG. 2 is a schematic layout view of a display panel included in the display device according to the aspect(s) of the present disclosure.
Figure 3:
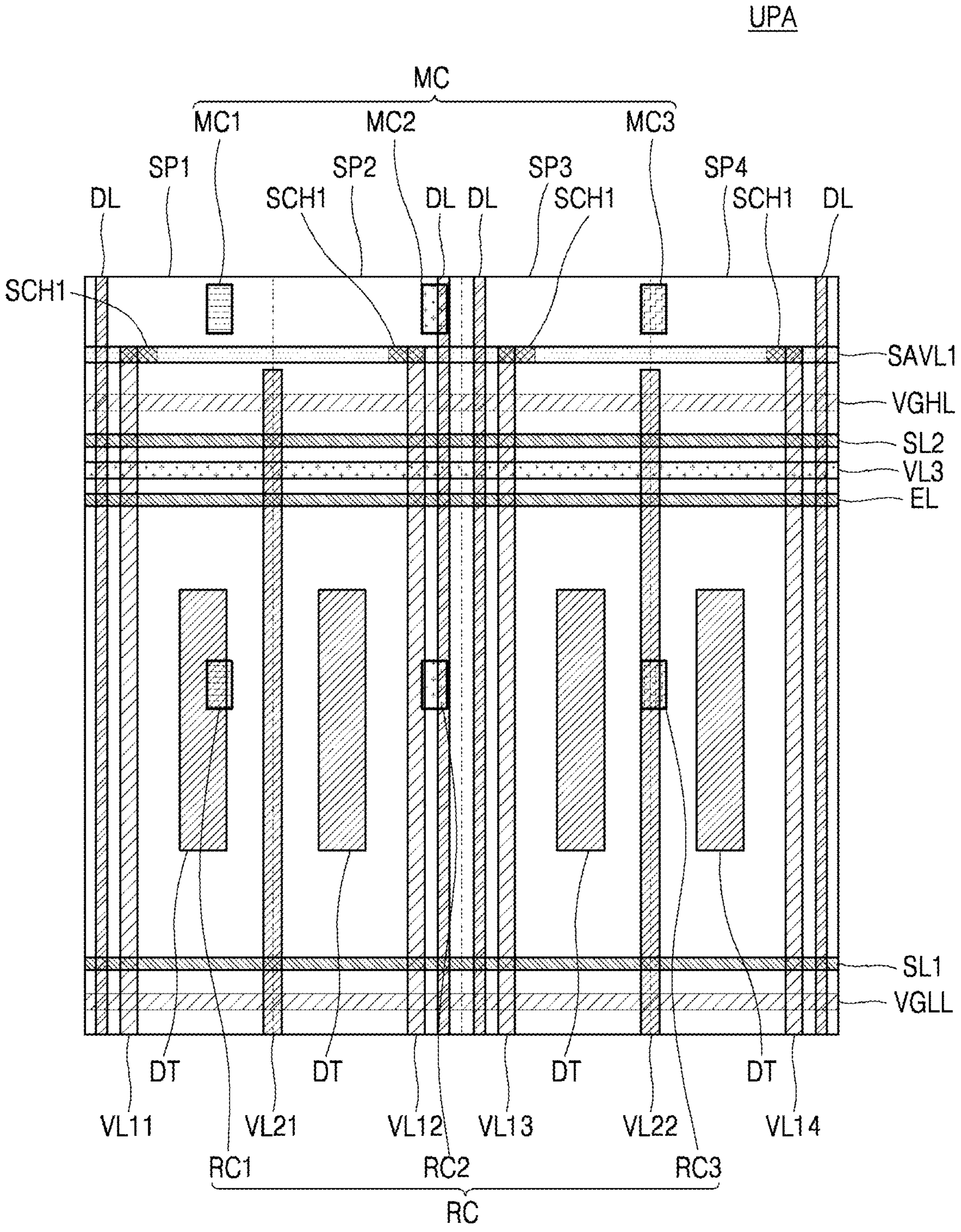
FIG. 3 is an enlarged layout view of one sub-pixel included in the display device according to the aspect(s) of the present disclosure.

FIG. 2 is a schematic layout view of a display panel included in the display device according to the aspect(s) of the present disclosure. For convenience of description, FIG. 2 shows a substrate 110, a plurality of unit pixel areas UPA, a plurality of pads VP1, VP2, DP, and GP, and a plurality of lines, among various constituent elements of the display device 100. FIG. 3 is a layout view of one unit pixel area included in the display device according to the aspect(s) of the present disclosure.

Referring to FIGS. 2 and 3, the substrate 110 is a configuration for supporting various constituent elements included in a display panel PN. The substrate 110 can be made of an insulating material. For example, the substrate 110 can be made of glass, resin, or the like. Otherwise, the substrate 110 can be formed through inclusion of a polymer or plastic, or can be made of a material having flexibility.

The substrate 110 can be divided into an active area and a non-active area. The active area is an area on which an image is displayed. The active area can include a plurality of unit pixel areas UPA. The plurality of unit pixel areas UPA can each include at least two sub-pixels SP. Although each unit pixel area UPA is shown in the drawings as including four sub-pixels SP1, SP2, SP3, and SP4, the present disclosure is not limited thereto. The four sub-pixels include a first sub-pixel SP1, a second sub-pixel SP2, a third sub-pixel SP3, and a fourth sub-pixel SP4. Here, for convenience of description, the unit pixel area UPA can be referred to as a "pixel area", and the non-active area can be referred to as a "non-pixel area".

Each of the plurality of sub-pixels is an individual unit of a configuration for emitting light. A plurality of light emitting elements MC and RC and a sub-pixel circuit are disposed at each of the plurality of sub-pixels. Each sub-pixel unit including the four sub-pixels SP1, SP2, SP3, and SP4 can include sub-pixels configured to emit at least two colors among a red sub-pixel, a green sub-pixel, and a blue sub-pixel or can include sub-pixels configured to emit at least two colors among a red sub-pixel, a green sub-pixel, a blue sub-pixel, and a white sub-pixel, without being limited thereto.

The sub-pixel unit can also include at least two sub-pixels each including a light emitting element having a lowest efficiency among a red light emitting element, a green light emitting element, and a blue light emitting element. When the light emitting elements are LEDs, the red light emitting element exhibits low efficiency.

Meanwhile, the sub-pixel circuit can include a drive transistor DT configured to supply a drive current to the plurality of light emitting elements MC and RC. A part of the plurality of light emitting elements MC and RC can be disposed to overlap with the drive transistor DT.

The display device 100 according to the aspect(s) of the present disclosure can include first and second sub-pixels SP1 and SP2 configured to emit red light, a third sub-pixel SP3 configured to emit green light, and a fourth sub-pixel SP4 configured to emit blue light. The first sub-pixel SP1, the second sub-pixel SP2, the third sub-pixel SP3, and the fourth sub-pixel SP4 can be disposed in a row direction in parallel.

As described above, the active area is an area in which the plurality of sub-pixel units is disposed, whereas the non-active area is an area in which no image is displayed. Here, the non-active area can be an area in which no sub-pixel unit is disposed, for example, an area in which the gate driver GD configured to drive the plurality of sub-pixels SP disposed in the active area, lines, pads configured to apply signals to the lines, etc. are disposed.

The gate driver GD supplies a gate signal to the plurality of sub-pixels SP through gate lines GL. The gate signal includes a scan signal and an emission signal.

The scan signal is supplied through a scan line SL, and the emission signal is supplied through an emission line EL. In addition, the scan line SL and the emission line EL can be collectively referred to as a "gate line GL". If necessary, two or more scan lines SL can be provided. The following description will be given in conjunction with an example in which the scan line SL includes a first scan line SL1 and a second scan line SL2.

The gate driver GD can include a scan driver configured to supply a scan signal and an emission driver configured to supply an emission signal.

In the display device 100 according to the aspect(s) of the present disclosure, the gate driver GD is divided into a plurality of parts on the substrate 110 such that the divided parts are disposed in gate driving circuit areas GA among the plurality of unit pixel areas UPA, respectively.

In the display device 100 according to the aspect(s) of the present disclosure, each light emitting element can be a light emitting diode (LED) which can be an inorganic light emitting element. Since the LED exhibits excellent luminous efficacy, the area occupied by the LED, for example, each of the light emitting elements MC and RC, per unit pixel area UPA can be very small. Accordingly, a sub-pixel circuit and at least one light emitting element connected to the sub-pixel circuit, for example, the light emitting elements MC and RC, can be disposed at each of the sub-pixels SP1, SP2, SP3, and SP4, and a gate driving circuit GC can be disposed in the non-active area per at least one unit pixel area UPA.

Meanwhile, the light emitting elements MC and RC can be disposed at the substrate 110 through a transfer process. In this case, an alignment key AK configured to align the light emitting elements MC and RC with the substrate 110 can be disposed in each gate driving circuit area GA. The alignment key AK can be disposed among the gate driving circuits GC disposed in a column direction in each gate driving circuit area GA.

In the case of FIG. 2, each gate driving circuit area GA is disposed between adjacent ones of the unit pixel areas UPA in the column direction, and gate driving circuits GC are disposed in each gate driving circuit area GA. Each of the gate driving circuits GC can be electrically connected to a plurality of gate driving circuits GC disposed in the row direction together therewith and, as such, can supply a gate signal to sub-pixels disposed in the same row. In this case, a gate driving line GCVL configured to transmit a signal for driving of the gate driving circuit GC can be disposed in the row direction. The gate driving line GCVL includes a high-level voltage line VGHL (FIG. 3) and a low-level voltage line VGLL (FIG. 3). The high-level voltage line VGHL and the lower-level voltage line VGLL can be disposed in the unit pixel areas UPA in the row direction.

As described above, the gate driver includes the scan driver and the emission driver and, as such, the gate driving circuit GC includes a scan driving circuit and an emission driving circuit. The gate driving circuit can also be referred to as a "scan driving circuit" or an "emission driving circuit". In addition, the gate driving line can also be referred to as a "scan driving line" or an "emission driving line". Meanwhile, the scan driving circuit and the emission driving circuit can be disposed in the same row, but can be disposed in different areas, respectively.

The data driver DD converts image data into a data signal, and supplies the converted data signal to the sub-pixels SP1, SP2, SP3, and SP4 through data lines DL, respectively. The data driver DD can be formed at a back surface of the substrate 110 or can be formed at a separate substrate. When the data driver DD is formed at one surface of a separate substrate, the substrate 110 and the separate substrate can be assembled to each other such that the other surface of the separate substrate, at which the data driver DD is not formed, faces the back surface of the substrate 110.

In order to electrically interconnect front and back surfaces of the substrate 110 or to electrically interconnect the front surface of the substrate 110 and the other surface of the separate substrate, a side line is disposed at a side surface of the substrate 110 or a side surface of the substrate separate from the substrate 110. Accordingly, the data driver DD disposed at the back surface of the substrate 110 or the other surface of the separate substrate can supply the data signal to the sub-pixels SP through the side line.

As described above, the gate driver GD in the display device 100 according to the aspect(s) of the present disclosure can be disposed between adjacent sub-pixel units on the substrate 110. However, the present disclosure is not limited to the above-described condition, and the gate driver GD can be disposed at one side or opposite sides of the substrate 110.

Meanwhile, each gate line GL can be disposed on the substrate 110 in the row direction, and each data line DL can be disposed on the substrate 110 in the column direction. The gate line GL and the data line DL are disposed at all sub-pixels SP and, as such, supply signals to the sub-pixel circuits disposed at the sub-pixels SP.

Pad areas PA1 and PA2, in which pads are disposed, are formed at opposite sides of the substrate 110, for example, upper and lower portions of the substrate 110, in the row direction. In this case, the pad area formed at the upper portion of the substrate 110 is referred to as a "first pad area PA1", and the pad area formed at the lower portion of the substrate 110 is referred to as a "second pad area PA2". The first pad area PA1 and the second pad area PAD2 are facing areas in the substrate 110.

In the first pad area PA1, data pads DP connected to the data lines DL, gate pads GP connected to the gate driver GD, a high-level voltage pad VP1 connected to a high-level voltage line VL1, and a reference voltage pad connected to a reference voltage line VL3 can be disposed. In this case, the data pads DP can be disposed to correspond in number to the sub-pixels SP included in each sub-pixel unit. In addition, the high-level voltage line VL1 can be referred to as a "first power line", and the reference voltage line VL3 can be referred to as a "second power line".

In the gate driver GD, lines configured to supply various clock signals, a line configured to supply a gate-low drive voltage, a line configured to supply a gate-high voltage, etc. can be disposed and, as such, can transmit signals associated therewith. When there are gate drivers GD, the gate drivers GD are disposed in the column direction in parallel, and lines configured to transmit signals to each gate driver GD are aligned with the gate driver GD. The lines configured to transmit signals to the gate driver GD are referred to as "gate driving lines". The gate driving lines are disposed in the column direction and are connected to respective gate pads GP disposed in the first pad area PA1 and, as such, receive signals from the gate pads GP, respectively.

Referring to FIG. 2, the high-level voltage line VL1 can be disposed in the column direction between adjacent ones of the unit pixel areas UPA. The high-level voltage line VL1 disposed in the column direction supplies a high-level voltage to a plurality of sub-pixels SP through the high-level voltage pad VP1 disposed in the first pad area PA1. When a plurality of high-level voltage lines VL1 is disposed in the column direction, the plurality of high-level voltage lines VL1 is connected to auxiliary high-level voltage lines AVL1 disposed in the row direction and can form a mesh structure. The auxiliary high-level voltage lines AVL1 can be disposed between adjacent ones of the unit pixel areas UPA in all rows or a plurality of rows where sub-pixels are disposed, respectively. Each auxiliary high-level voltage line AVL1 can prevent voltage drop of corresponding ones of the high-level voltage lines VL1 and can supply a high-level voltage to a plurality of sub-pixels SP.

Referring to FIG. 3, high-level voltage lines VL11, VL12, VL13, and VL14 can be disposed in the column direction for respective sub-pixels SP1, SP2, SP3, and SP4 disposed in each unit pixel area UPA. The plural high-level voltage lines VL11, VL12, VL13, and VL14 disposed in each unit pixel area UPA are connected, through contact holes SCH1, to an auxiliary high-level voltage line SAVL1 disposed in the row direction in the unit pixel area UPA and, as such, can form a mesh structure.

The high-level voltage lines VL1, VL11, VL12, VL13, and VL14 and the auxiliary high-level voltage lines AVL1 and SAVL1, which are disposed inside and outside the unit pixel areas UPA, are electrically interconnected and, as such, form a mesh structure and receive a high-level voltage via the high-level voltage pad VP1.

In the second pad area PA2, high-level voltage pads VP2 connected to low-level voltage lines VL2, VL21, and VL22 can be disposed. The low-level voltage lines VL2, VL21, and VL22 can be disposed at opposite sides of each driving circuit area GA under the condition that the driving circuit area GA is interposed between adjacent ones thereof and can be disposed between adjacent ones of the sub-pixels and, as such, can supply a low-level voltage to the sub-pixels. Of course, the present disclosure is not limited to the above-described condition, and the low-level voltage lines VL2, VL21, and VL22 can be disposed at each sub-pixel. The low-level voltage lines VL2, VL21, and VL22 can be referred to as "second power lines".

The low-level voltage lines VL21 and VL22, which are disposed in plural in the column direction, are connected to an auxiliary low-level voltage line AVL2 disposed in the row direction. The auxiliary low-level voltage line AVL2 can be disposed in all rows or a plurality of rows where unit pixel areas UPA are disposed. The auxiliary low-level voltage line AVL2 can prevent voltage drop of the low-level voltage lines VL21 and VL22 and can supply a low-level voltage to a plurality of sub-pixels SP.

The reference voltage line VL3 can be disposed in the row direction for each of unit pixel areas UPA disposed in the row direction. The reference voltage line VL3 disposed in the row direction supplies a reference voltage to the sub-pixel unit corresponding thereto through a column-direction line which is separately disposed. The reference voltage line VL3 is connected to the reference voltage pad disposed in the first pad area PA1 and, as such, a reference voltage is supplied to a plurality of reference voltage lines VL3 through the reference voltage pad.

In order to reduce a bezel of the display panel PN included in the display device 100 according to the aspect(s) of the present disclosure, an edge of the substrate 110 can be removed through grinding.

The bezel is an edge area of the substrate 110 where the sub-pixels SP1, SP2, SP3, and SP4 are not disposed. During grinding, portions of pads and lines disposed at the edge of the substrate 110 are removed and, as such, the size of the substrate 110 is reduced such that the display panel PN is implemented to have the same size as that of a final substrate 110F.

In detail, most of the pads disposed in the first pad area PA1 and the second pad area PA2 are removed from the final substrate 110F and, as such, only a part of the pads or a trace of the pads can remain.

Hereinafter, circuits of the plurality of sub-pixels SP1, SP2, SP3, and SP4 according to aspects of the present disclosure will be described.

Figure 4:
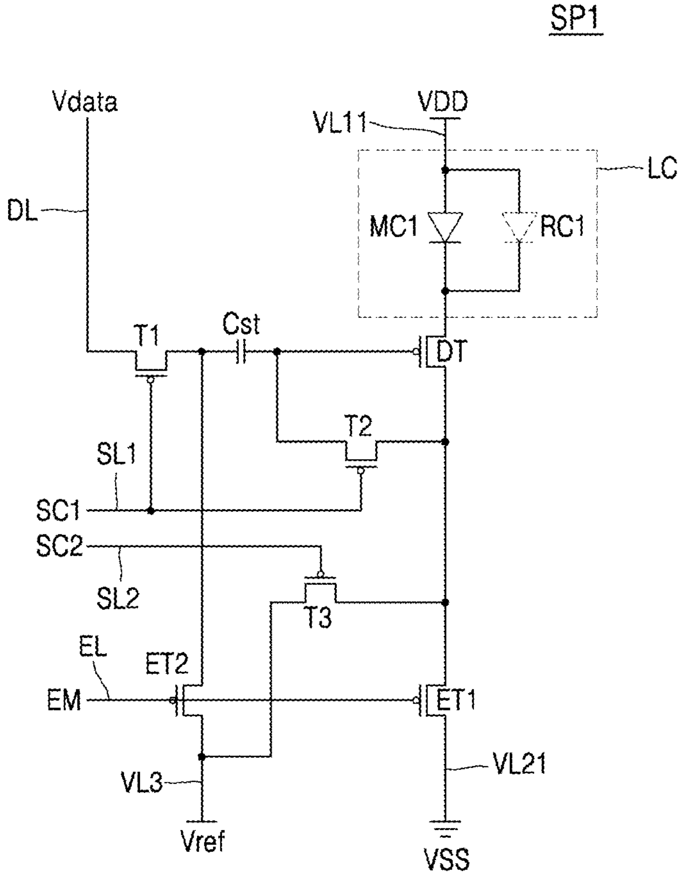
FIG. 4 is a circuit diagram of one sub-pixel included in the display device according to the aspect(s) of the present disclosure.

FIG. 4 is a circuit diagram of one sub-pixel included in the display device according to the aspect(s) of the present disclosure. Particularly, FIG. 4 is a circuit diagram of a sub-pixel circuit included in the first sub-pixel SP1. The same sub-pixel circuit as that of the first sub-pixel SP1 can be applied to the remaining sub-pixels SP2, SP3, and SP4.

Referring to FIG. 4, the first sub-pixel SP1 includes a light emitting element LC, and a sub-pixel circuit configured to supply a drive current to the light emitting element LC.

The light emitting element LC can include a first main light emitting element MC1 and a first auxiliary light emitting element RC1, without being limited thereto. For example, when it is assumed that the sub-pixel circuit included in the first sub-pixel PS1 is a first sub-pixel circuit, the sub-pixel circuit included in the second sub-pixel PS2 is a second sub-pixel circuit, the sub-pixel circuit included in the third sub-pixel PS3 is a third sub-pixel circuit, and the sub-pixel circuit included in the fourth sub-pixel PS4 is a fourth sub-pixel circuit, the first sub-pixel circuit can be connected to the first main light emitting element MC1, the second sub-pixel circuit can be connected to the first auxiliary light emitting element RC1, the third sub-pixel circuit can be connected to a second main light emitting element MC2 and a second auxiliary light emitting element RC2, and the fourth sub-pixel circuit can be connected to a third main light emitting element MC3 and a third auxiliary light emitting element RC3. When two light emitting elements are connected to one sub-pixel circuit, as in the above-described case, the two light emitting elements can be connected to each other in parallel.

Here, FIG. 4 illustrates the case in which the first main light emitting element MC1 and the first auxiliary light emitting element RC1 are disposed in parallel. An anode of the first main light emitting element MC1 and an anode of the first auxiliary light emitting element RC1 are connected to a high-level voltage line VL11 to which a high-level voltage VDD is supplied. In addition, a cathode of the first main light emitting element MC1 and a cathode of the first auxiliary light emitting element RC1 are connected to the sub-pixel circuit.

The sub-pixel circuit can include six transistors and one capacitor.

Each of the transistors can be a thin film transistor of an N-type or a P-type. In the present disclosure, description will be given in conjunction with, for example, the case in which each of the transistors is a P-type transistor. In addition, the transistors can be made of a semiconductor material such as oxide semiconductor, amorphous silicon, polysilicon, or the like, without being limited thereto.

A driving transistor DT includes a gate, a source, and a drain. In the driving transistor, the gate thereof is connected to one electrode of a capacitor Cst, the source thereof is connected to the cathodes of the first main light emitting element MC1 and the first auxiliary light emitting element RC1, and the drain thereof is connected to a source of a first emission transistor ET1. The driving transistor DT is controlled by a voltage applied to the gate thereof, thereby controlling a voltage of the cathodes. Accordingly, the first main light emitting element MC1 and the first auxiliary light emitting element RC1 can emit light.

A first transistor T1 includes a gate, a source, and a drain. In the first transistor T1, the gate thereof is connected to a first scan line SL1, the source thereof is connected to a data line DL, and the drain thereof is connected to the other electrode of the capacitor Cst. The first transistor T1 is controlled by a first scan signal SC1, thereby supplying a data voltage Vdata to the other electrode of the capacitor Cst.

A second transistor T2 includes a gate, a source, and a drain. In the second transistor T2, the gate thereof is connected to the first scan line SL1, the source thereof is connected to the other electrode of the capacitor Cst, and the drain thereof is connected to the drain of the driving transistor DT. The second transistor T2 is controlled by the first scan signal SC1, thereby causing the gate and the drain of the driving transistor DT to be conducted, and, as such, a diode connection of the driving transistor DT can be established. Accordingly, the second transistor T2 can sample a threshold voltage of the driving transistor DT.

A third transistor T3 includes a gate, a source, and a drain. In the third transistor T3, the gate thereof is connected to a second scan line SL2, the source thereof is connected to the drain of the driving transistor DT, and the drain thereof is connected to a reference voltage line VL3. The third transistor T3 is controlled by a second scan signal SC2, thereby supplying a reference voltage Vref to the drain of the driving transistor DT.

A first light emitting transistor ET1 includes a gate, a source, and a drain. In the first light emitting transistor ET1, the gate thereof is connected to an emission line EL, the source thereof is connected to the drain of the driving transistor DT, and the drain thereof is connected to a low-level voltage line VL21. The first light emitting transistor ET1 is controlled by an emission signal EM, thereby supplying a low-level voltage VSS to the drain of the driving transistor DT.

A second light emitting transistor ET2 includes a gate, a source, and a drain. In the second light emitting transistor ET2, the gate thereof is connected to the emission line EL, the source thereof is connected to the other electrode of the capacitor Cst and the drain of the first transistor T1, and the drain thereof is connected to the reference voltage line VL3. The second light emitting transistor ET2 is controlled by the emission signal EM, thereby supplying the reference voltage Vref to the other electrode of the capacitor Cst and the drain of the first transistor T1.

The sources and drains of the above-described transistors can be interchanged in terms of constituent element names in accordance with kinds of the transistors or voltages applied to the transistors.

Figure 5:
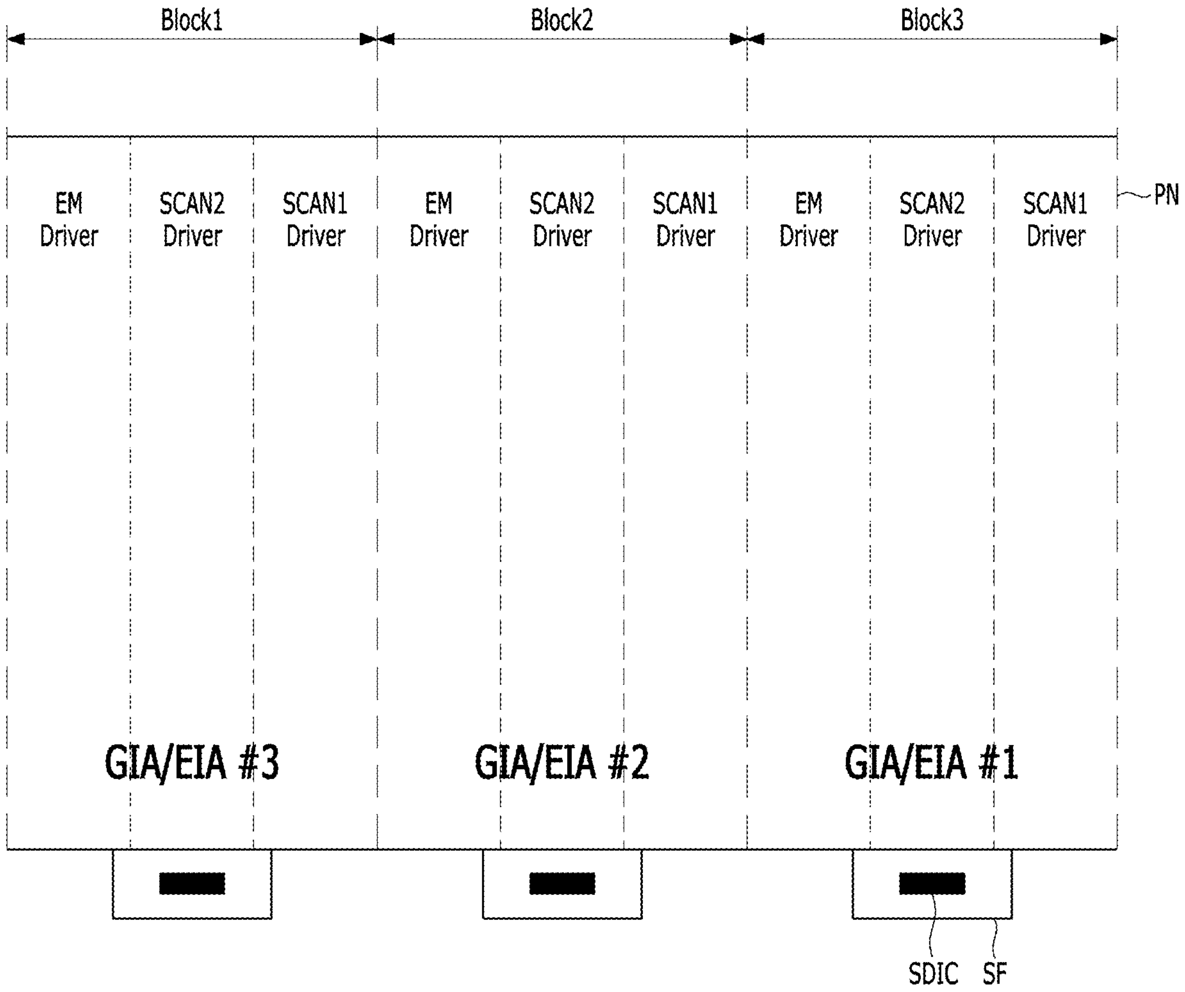
FIG. 5 is a diagram illustrating an arrangement method of a gate driver of the display device according to the aspect(s) of the present disclosure.

FIG. 5 is a diagram illustrating an arrangement method of the gate driver of the display device according to the aspect(s) of the present disclosure. Particularly, FIG. 5 is a diagram illustrating a configuration of the gate driver configured to supply drive signals to the sub-pixel circuit of FIG. 4. As described above, the sub-pixel circuit of FIG. 4 can be driven in accordance with the first scan signal SC1, the second scan signal SL2, and the emission signal EM input thereto. Accordingly, the gate driver can include a first scan driver SCAN1 Driver, a second scan driver SCAN2 Driver, and an emission driver EM Driver.

Referring to FIG. 5, the display panel PN can be driven under the condition that the entire area thereof is divided into three blocks Block1, Block2, and Block3. In this case, gate drivers GIA/EIA #1, GIA/EIA #2 and GIA/EIA #3, each of which includes a first scan driver SCAN1 Driver, a second scan driver SCAN2 Driver, and an emission driver EM Driver, can be disposed in pixel areas of respective blocks Block1, Block2, and Block3. For example, in the display device 100 according to the aspect(s) of the present disclosure, the gate driver GD can include scan drivers and emission drivers in a gate driver-in-array (GIA) manner in which scan drivers are disposed among pixel areas or in an emission driver-in-array (EIA) manner in which emission drivers are disposed among pixel areas.

Data drivers SDIC each configured to supply a data signal to each sub-pixel can be connected to the blocks Block1, Block2, and Block3, respectively. The numbers and the arrangement method of the gate drivers GIA/EIA #1, GIA/EIA #2 and GIA/EIA #3 and the data drivers SDIC included in the display panel PN as described above are only illustrative, and can be diversely varied for application thereof.

Figure 6:
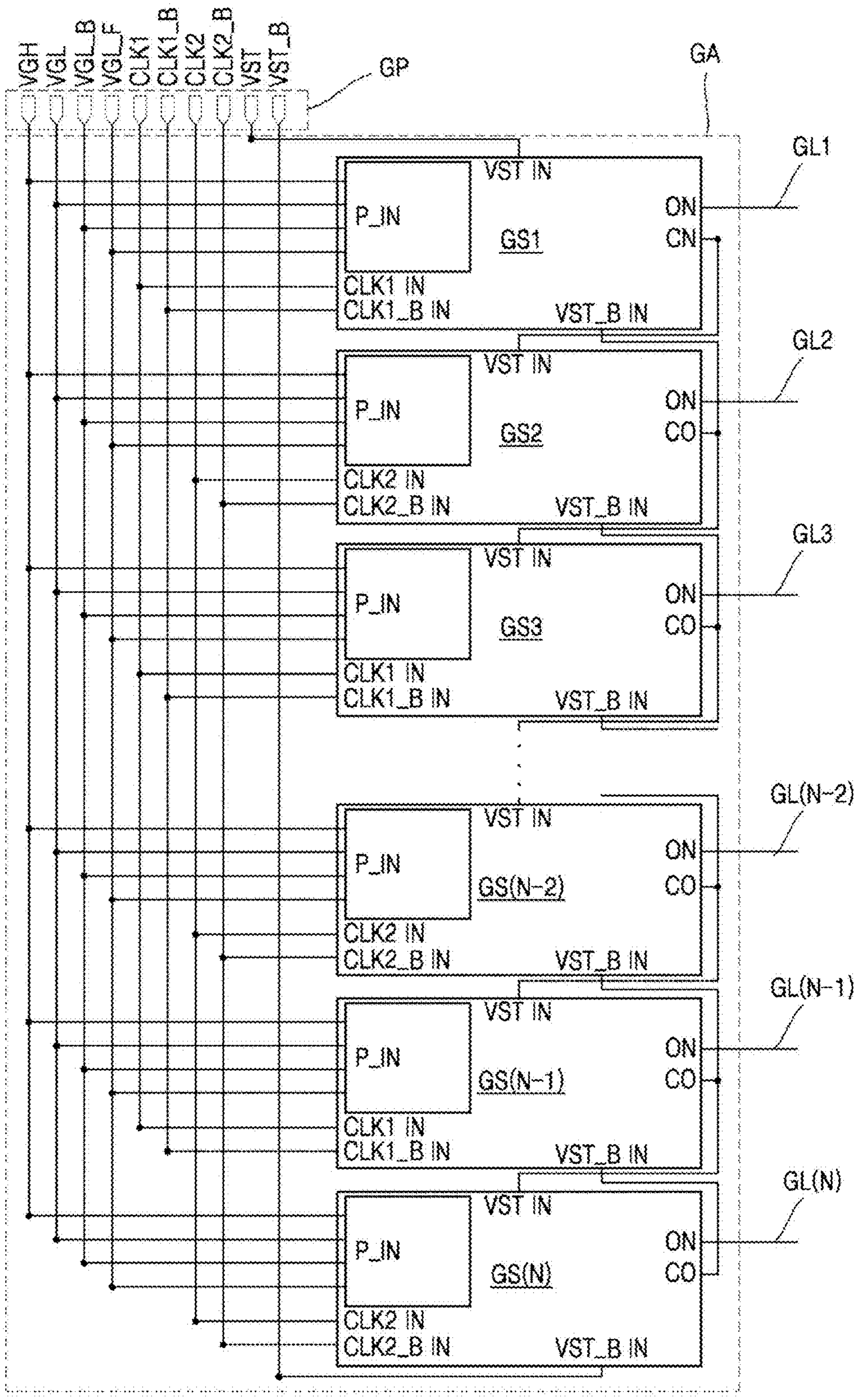
FIG. 6 is a diagram illustrating a configuration of the gate driver included in the display device according to the aspect(s) of the present disclosure.

FIG. 6 is a diagram illustrating a configuration of the gate driver included in the display device according to the aspect(s) of the present disclosure. Here, the gate driver can represent an emission driver.

Referring to FIG. 6, the gate driver includes a plurality of stages GS1, GS2, GS3, . . . , GS(N−2), GS(N−1), and GS(N). The plurality of stages is N in number, and "N" is a natural number. The plurality of stages GS1, GS2, GS3, . . . , GS(N−2), GS(N−1), and GS(N) can be sequentially driven in such a manner that each stage receives a carry signal Carry from an upstream stage, thereby outputting a gate signal.

The gate driver included in the display device according to the aspect(s) of the present disclosure can perform forward driving in which gate signals are sequentially output in accordance with sequential driving of the gate driver from the first stage GS1 to the N-th stage GS(N) in a forward direction or backward driving in which gate signals are sequentially output in accordance with sequential driving of the gate driver from the N-th stage GS(N) to the first stage GS1 in a backward direction. In the forward driving, the carry signal Carry is sequentially transferred from the first stage GS1 to the N-th stage GS(N), whereas, in the backward driving, the carry signal Carry is sequentially transferred from the N-th stage GS(N) to the first stage GS1. In this case, the gate driver included in the display device according to the aspect(s) of the present disclosure independently includes a configuration for outputting and transferring the carry signal Carry in forward driving and a configuration for outputting and transferring the carry signal Carry in backward driving and, as such, can reduce a degradation phenomenon of elements caused by extended driving.

In the gate driver included in the display device according to the aspect(s) of the present disclosure, a plurality of clock signal lines, a plurality of voltage lines, and a plurality of signal lines configured to drive the plurality of stages GS1, GS2, GS3, . . . , GS(N−2), GS(N−1), and GS(N) are disposed in a gate driving circuit area GA.

The plurality of clock signal lines can include a first clock signal line configured to supply a first clock signal CLK1, a first backward clock signal line configured to supply a first backward clock signal CLK1_B, a second clock signal line configured to supply a second clock signal CLK2, and a second backward clock signal line configured to supply a second backward clock signal CLK2_B.

The plurality of voltage lines can include a high-level voltage line configured to supply a high-level voltage VGH, a low-level drive voltage line configured to supply a low-level drive voltage VGL, a forward low-level drive voltage line configured to supply a forward low-level drive voltage VGL F, and a backward low-level drive voltage line configured to supply a backward low-level drive voltage VGL_B.

The plurality of signal lines can include a start signal line configured to supply a start signal VST, a backward start signal line configured to supply a backward start signal VST_B, and a reset signal line configured to supply a reset signal.

The plurality of stages GS1, GS2, GS3, . . . , GS(N−2), GS(N−1), and GS(N), the plurality of clock signal lines, and the plurality of voltage lines are disposed in the gate driving circuit area GA. Gate pads GP configured to supply signals to ends of the plurality of clock signal lines and the plurality of voltage lines can also be disposed.

Each of the plurality of stages GS1, GS2, GS3, . . . , GS(N−2), GS(N−1), and GS(N) includes a low power input P_IN and clock signal inputs CLK1 IN, CLK1_B IN, CLK2 IN, and CLK2_B IN. The low power input P_IN includes a plurality of nodes, and receives voltages supplied from the plurality of voltage lines.

For example, when "N" is an even number, odd ones of the plurality of stages GS1, GS2, GS3, . . . , GS(N−2), GS(N−1), and GS(N), for example, the odd stages GS1, GS3, . . . , and GS(N−1), can be connected to the first clock signal line configured to supply the first clock signal CLK1 and the first backward clock signal line configured to supply the first backward clock signal CLK1_B, and the even stages GS2, . . . , GS(N−2), and GS(N) can be connected to the second clock signal line configured to supply the second clock signal CLK2 and the second backward clock signal line configured to supply the second backward clock signal CLK2_B.

Each of the plurality of stages GS1, GS2, GS3, . . . , GS(N−2), GS(N−1), and GS(N) includes a start signal node VST IN, to which the start signal VST is input, and a backward start signal node VST_B IN, to which the backward start signal VST_B is input. In addition, each of the plurality of stages GS1, GS2, GS3, . . . , GS(N−2), GS(N−1), and GS(N) includes an output node ON, from which a gate signal is output, a forward carry node CFO, from which a carry signal is output in forward driving, and a backward carry node CBO, from which a carry signal is output in backward driving.

The start signal node VST IN of the first stage GS1 is connected to the start signal line configured to supply the start signal VST, and the backward start signal node VST_B IN of the N-th stage GS(N) is connected to the backward start signal line configured to supply the backward start signal VST_B.

The start signal node VST IN of each of the second stage GS2 to the N−1-th stage GS(N−1) is connected to the forward carry node CFO of an upstream stage and receives a carry signal from the forward carry node CFO. In addition, the backward start signal node VST_B IN of each of the second stage GS2 to the N−1-th stage GS(N−1) is connected to the backward carry node CBO of a downstream stage and receives a carry signal from the backward carry node CBO.

The output node ON included in each of the plurality of stages GS1, GS2, GS3, . . . , GS(N−2), GS(N−1), and GS(N) is connected to a gate line and, as such, outputs a gate signal. The first stage GS1 is connected to a first gate line GL1, the second stage GS2 to a second gate line GL2, the third stage GS3 to a third gate line GL3, . . . , the N−2-th stage GS(N−2) to an N−2-th gate line GL(N−2), the N−1-th stage GS(N−1) to an N−1-th gate line GL(N−1), and the N-th stage GS(N) to an N-th gate line GL(N). In this case, the gate line can be an emission line.

The gate driver according to the aspect(s) of the present disclosure can perform forward driving and backward driving. In forward driving, the first stage GS1 first starts driving by the start signal VST, and the start signal nodes VST IN of the second stage GS2 to the N−1-th stage GS(N−1) are connected to the forward carry nodes CFO of upstream stages thereof, to receive carry signals, and, as such, the first to N-th stages GS1 to GS(N) sequentially output gate signals, respectively. In backward driving, the N-th stage GS(N) first starts driving by the backward start signal VST_B, and the backward start signal nodes VST_B IN of the second stage GS2 to the N−1-th stage GS(N−1) are connected to the backward carry nodes CBO of downstream stages thereof and, as such, the first to N-th stages GS1 to GS(N) are sequentially driven in a backward direction from the N-th stage to the first stage GS1, and, as such, sequentially output gate signals, respectively.

Accordingly, the gate driver according to the aspect(s) of the present disclosure can perform bidirectional driving using one gate driver and, as such, can reduce costs. In addition, since the gate driver according to the aspect(s) of the present disclosure independently includes the configuration for outputting and transferring the carry signal Carry in forward driving and the configuration for outputting and transferring the carry signal Carry in backward driving, it can be possible to reduce a degradation phenomenon of elements caused by extended driving.

Figure 7:
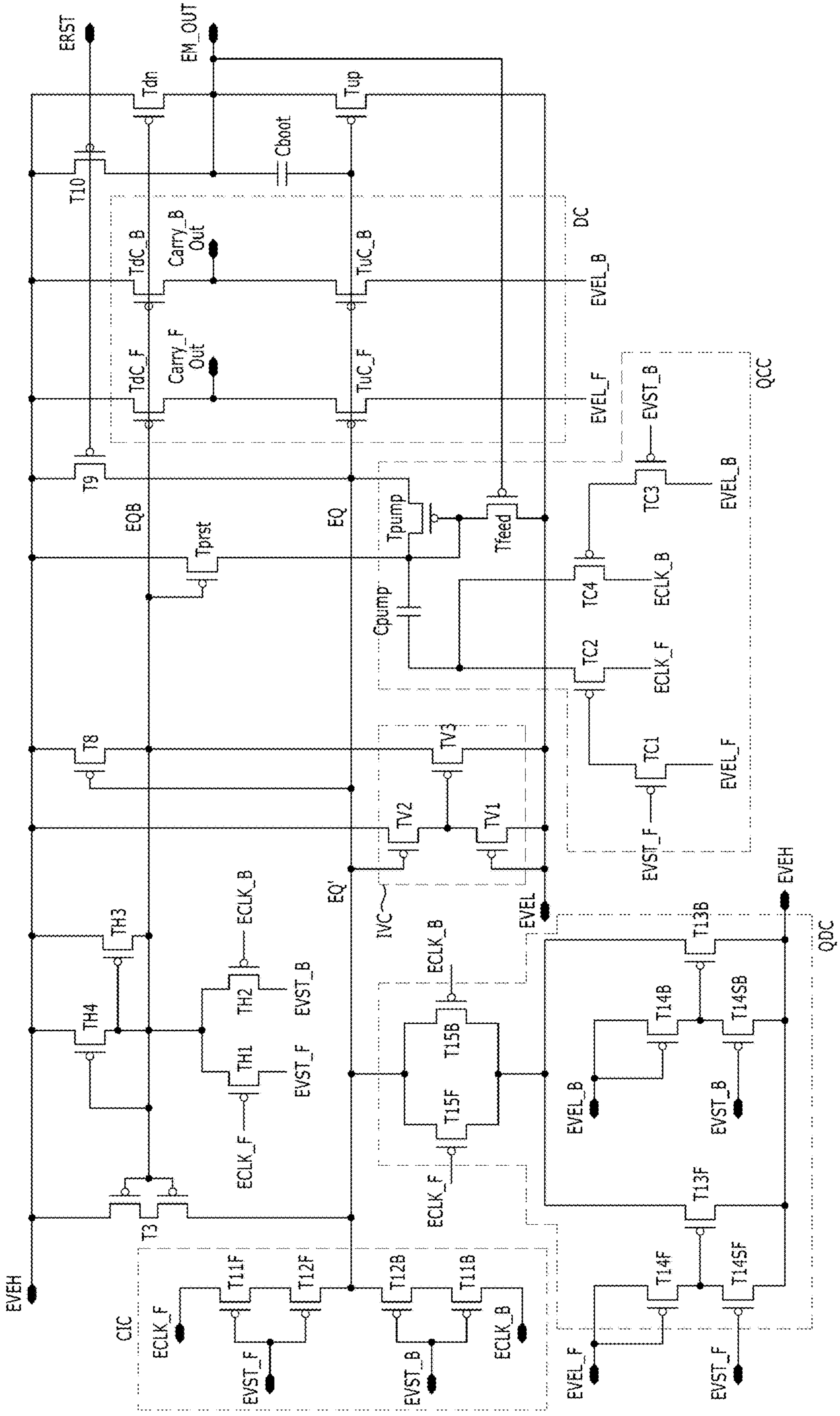
FIG. 7 is a circuit diagram illustrating an emission driving circuit included in a gate driver according to an aspect of the present disclosure.
Figure 8:
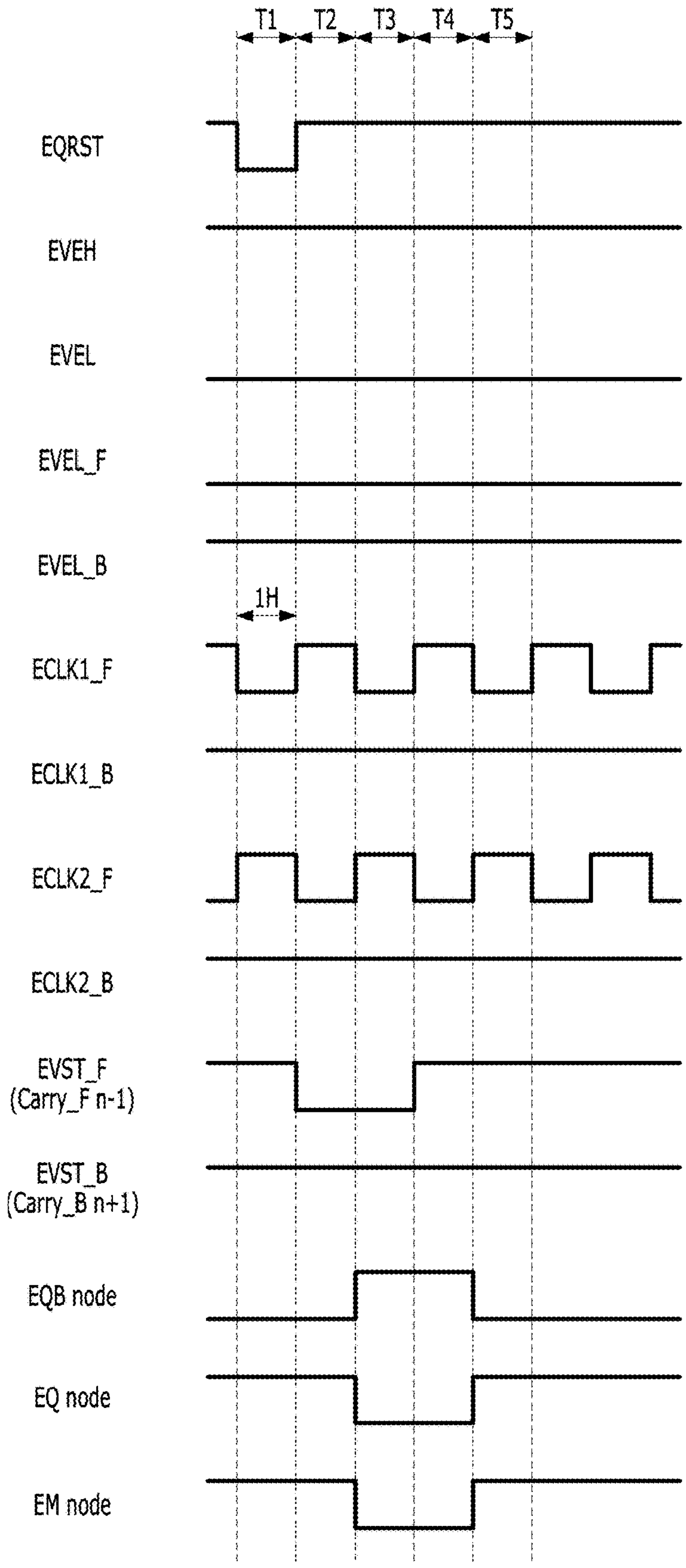
FIG. 8 is a diagram illustrating driving timings of the emission driving circuit of FIG. 7.

FIGS. 7 and 8 are circuit diagrams explaining a gate driving circuit according to an aspect of the present disclosure. The following description will be given in conjunction with an example in which a gate driver is an emission driver.

Particularly, FIG. 7 is a circuit diagram illustrating an emission driving circuit included in a gate driver according to an aspect of the present disclosure. FIG. 8 is a diagram illustrating driving timings of the emission driving circuit of FIG. 7.

The emission driving circuit can be disposed in a plurality of gate driving circuit areas GA in a divided manner. In detail, the emission driving circuit can be disposed in a divided manner in a plurality of gate driving circuit areas GA disposed in rows in which emission lines EL configured to receive an emission signal EM are disposed. In addition, the emission driving circuit can be included in one of the plurality of stages GS1, GS2, GS3, . . . , GS(N−2), GS(N−1), and GS(N) of FIG. 6.

Transistors included in the emission driving circuit are transistors each including a gate, a first source/drain, and a second source/drain. The following description will be given in conjunction with an example in which each of the transistors is a P-type transistor. The P-type transistor is turned on when a low drive voltage is applied to a gate thereof, and is turned off when a high drive voltage is applied to the gate thereof.

Referring to FIGS. 7 and 8, the emission driving circuit can be driven by a high drive voltage EVEH, a low drive voltage EVEL, a forward low voltage EVEL_F, a backward low voltage EVEL_B, a forward start signal EVST_F, a backward start signal EVST_B, a clock signal ECLK, and an emission control reset signal ERST, thereby outputting an emission signal EM and a forward carry signal Carry_F or a backward carry signal Carry_B.

The emission driving circuit can include a plurality of transistors and a capacitor, together with a pull-up transistor Tup, a pull-down transistor Tdn, a dual carry circuit DC, a Q-node charging circuit QCC, a Q-node discharging circuit QDC, an inverter circuit IVC, and a clock input circuit CIC.

The pull-up transistor Tup can be electrically connected between an input terminal for the low drive voltage EVEL and an output terminal for the emission signal EM. The pull-up transistor Tup can be controlled by a voltage level of a Q-node EQ. The low drive voltage EVEL can be, for example, a low-level drive voltage. The pull-up transistor Tup can control output of an emission signal EM having a turn-on level to a gate line GL.

The pull-down transistor Tdn can be electrically connected between an input terminal for the high drive voltage EVEH and the output terminal for the emission signal EM. The pull-down transistor Tdn can be controlled by a voltage level of a QB-node EQB. The high drive voltage EVEH can be, for example, a high-level drive voltage. The pull-down transistor Tdn can control output of an emission signal EM having a turn-off level to the gate line GL.

A boot capacitor Cboot can be electrically connected between the Q-node EQ and the output terminal for the emission signal EM. The Q-node EQ can be coupled to the output terminal for the emission signal EM by the boot capacitor Cboot. The boot capacitor Cboot can lower the voltage level of the Q-node EQ at a time when the voltage level of the output terminal for the emission signal EM is lowered and the emission signal EM having the turn-on level is output.

The dual carry circuit DC can operate simultaneously with the pull-up transistor Tup and the pull-down transistor Tdn for output of the emission signal EM such that the dual carry circuit DC outputs the forward carry signal Carry_F in forward driving thereof and outputs the backward carry signal Carry_B in backward driving thereof. The dual carry circuit DC as described above includes a circuit configured to operate in forward driving, thereby outputting the forward carry signal Carry_F, and a circuit configured to operate in backward driving, thereby outputting the backward carry signal Carry_B.

The dual carry circuit DC can include a forward pull-up carry transistor TuC_F, a forward pull-down carry transistor TdC_F, a backward pull-up carry transistor TuC_B, and a backward pull-down carry transistor TdC_B.

The forward pull-up carry transistor TuC_F is connected to an input terminal for the forward low voltage EVEL_F and a forward carry signal output terminal Carry_F Out, and is controlled by a voltage of the Q-node EQ. The forward pull-down carry transistor TdC_F is connected to the input terminal for the high drive voltage EVEH and the forward carry signal output terminal Carry_F Out, and is controlled by the voltage of the Q-node EQ.

The backward pull-up carry transistor TuC_B is connected to an input terminal for the backward low voltage EVEL_B and a backward carry signal output terminal Carry_B Out, and is controlled by a voltage of the QB-node EQB. The backward pull-down carry transistor TdC_B is connected to the input terminal for the high drive voltage EVEH and the backward carry signal output terminal Carry_B Out, and is controlled by the voltage of the QB-node EQB.

As described above, the dual carry circuit DC can include both the transistors TuC_F and TdC_F configured to output the forward carry signal Carry_F and the transistors TuC_B and TdC_B configured to output the backward carry signal Carry_F. Accordingly, it can be possible to reduce degradation caused by extended driving, as compared to a related art circuit configured to output a carry signal to a single carry signal output terminal irrespective of driving directions.

The Q-node charging circuit QCC can charge a voltage of the Q-node EQ in order to output the emission signal EM having the turn-on level. Here, the emission signal EM of the turn-on level can be a low voltage, and the Q-node charging circuit QCC can charge the Q-node EQ with the low voltage and, as such, can output the emission signal EM of the turn-on level.

The Q-node charging circuit QCC can include a pump transistor Tpump, a pump capacitor Cpump, a feed transistor Tfeed, and transistors TC1, TC2, TC3, and TC4 for voltage selection.

The pump capacitor Cpump can be electrically connected between the Q-node EQ and the input terminal for the forward or backward low voltage EVEL_F or EVEL_B. The pump capacitor Cpump can maintain the Q-node EQ at a sufficiently low voltage level in a period in which the emission signal EM of the turn-on level is maintained.

The pump transistor Tpump can be electrically connected between the pump capacitor Cpump and the Q-node EQ. A gate node of the pump transistor Tpump can be electrically connected to a node between the feed transistor Tfeed and the pump capacitor Cpump. The pump transistor Tpump can operate in accordance with a signal supplied thereto through the feed transistor Tfeed.

The feed transistor Tfeed can be electrically connected between the gate node of the pump transistor Tpump and the input terminal for the low drive voltage EVEL. The feed transistor Tfeed can operate in accordance with a voltage level of the emission signal EM.

The transistor TC1 applies the forward low voltage EVEL_F to a gate of the transistor TC2 when the forward start signal EVST_F is input to a gate thereof.

The transistor TC2 applies the forward clock signal ECLK_F to the pump capacitor Cpump when the forward low voltage EVEL_F is input to the gate thereof.

The transistor TC3 applies the backward low voltage EVEL_B to a gate of the transistor TC4 when the backward start signal EVST_B is input to a gate thereof.

The transistor TC4 applies the backward clock signal ECLK_B to the pump capacitor Cpump when the backward low voltage EVEL_B is input to the gate thereof.

In accordance with the configurations of the transistors TC1 to TC4, the forward clock signal ECLK_F can be supplied to the pump capacitor Cpump during a period in which the forward start signal EVST_F is input, and the backward clock signal ECLK_B can be supplied to the pump capacitor Cpump during a period in which the backward start signal EVST_B is input.

A reset transistor Tprst can be electrically connected between the input terminal for the high drive voltage EVEH and the pump capacitor Cpump. The reset transistor Tprst can be electrically connected to the gate node of the pump transistor Tpump. The reset transistor Tprst can operate in accordance with a voltage level of the QB-node EQB.

The inverter circuit IVC maintains the QB-node EQB at a high voltage when the Q-node EQ is maintained at a low voltage, and applies a low voltage to the QB-node EQB when the Q-node EQ is maintained at a high voltage. The inverter circuit IVC includes a first inverting transistor TV1, a second inverting transistor TV2, and a third inverting transistor TV3.

The first inverting transistor TV1 is connected to the low drive voltage EVEL at a gate and a first source/drain thereof. The second inverting transistor TV2 is connected to the Q-node EQ at a gate thereof while being connected to the high drive voltage EVEH at a first source/drain thereof. A second source/drain of the first inverting transistor TV1 is connected to a second source/drain of the second inverting transistor TV2. The third inverting transistor TV3 is connected, at a gate thereof, to the second source/drain of the first inverting transistor TV1 and the second source/drain of the second inverting transistor TV2. The third inverting transistor TV3 is connected to the low drive voltage EVEL at a first source/drain thereof while being connected to the QB-node EQB at a second source/drain thereof.

In the inverter circuit IVC having the above-described configuration, the first inverting transistor TV1 always maintains a turn-on state by the low drive voltage EVEL, and applies the low drive voltage EVEL to the gate of the third inverting transistor TV3. When the Q-node EQ has a low voltage, the second inverting transistor TV2 is turned on, thereby applying the high drive voltage EVEH to the gate of the third inverting transistor TV3. As a result, the third inverting transistor TV3 is turned off, thereby causing the QB-node EQB to maintain the high dive voltage EVEH. When the Q-node EQ has a high voltage, the second inverting transistor TV2 is turned off. In this state, the third inverting transistor TV3 is turned on by the turned-on first inverting transistor TV1. The turned-on third inverting transistor TV3 supplies the low drive voltage EVEL to the QB-node. When the Q-node EQ has a low voltage, the inverter circuit IVC supplies the high drive voltage EVEH to the QB-node EQB and maintains the QB-node EQB at the high drive voltage EVEH, together with an eighth transistor T8 connected between the input terminal for the high drive voltage EVEH and the QB-node EQB.

A ninth transistor T9 can be electrically connected between the input terminal for the high drive voltage EVEH and the Q-node EQ. A tenth transistor T10 can be electrically connected between the input terminal for the high drive voltage EVEH and the output terminal for the emission signal EM. The ninth transistor T9 and the tenth transistor T10 can reset the Q-node EQ and the output terminal for the emission signal EM to the high drive voltage EVEH in accordance with an emission control reset signal ERST, When an emission control reset signal ERST having a turn-on level is supplied, the ninth transistor T9 and the tenth transistor T10 are turned on and, as such, the high drive voltage EVEH can be supplied to the Q-node EQ and the output terminal for the emission signal EM. As a result, the Q-node EQ is maintained at a high level, and the QB-node EQB is maintained at a low level, and, as such, an emission signal EM having a turn-off level can be output.

Transistors TH1, TH2, TH3, and TH4 can hold the QB-node EQB at a high voltage during driving of the Q-node EQ at a low voltage.

The transistor TH1 applies the forward start signal EVST_F when the forward clock signal ECLK_F is input to a gate thereof. The transistor TH2 applies the backward start signal EVST_B when the backward clock signal ECLK_B is input to a gate thereof.

The transistor TH3 applies the high drive voltage EVEH to the QB-node EQB when the forward or backward start signal EVST_F or EVST_B applied by the transistor TH1 or TH2 is input to a gate thereof.

The transistor TH4 is connected to the QB-node EQB at a gate thereof. Accordingly, the transistor TH4 applies the high drive voltage EVEH to the gate of the transistor TH3 when the QB-node EQB has a low voltage, and is turned off when the QB-node EQB has a high voltage.

In accordance with the above-described configuration, when the QB-node EQB has a low voltage, the transistor TH4 applies the high drive voltage EVEH to the gate of the transistor TH3, thereby turning off the transistor TH3, whereas, when the QB-node EQB has a high voltage, the transistor TH4 is turned off. In addition, the transistor TH3 can apply the high drive voltage EVEH to the QB-node EQB when the forward or backward start signal EVST_F or EVST_B applied by the transistor TH1 or TH2 is input.

The third transistor T3 is controlled by a voltage of the QB-node EQB and, as such, can apply the high drive voltage EVEH to the Q-node EQ when the QB-node EQB has a low voltage.

The clock input circuit CIC applies the forward clock signal ECLK_F and the backward clock signal ECLK_B to the Q-node EQ in accordance with the forward or backward start signal EVST_F or EVST_B.

The clock input circuit CIC includes transistors T11F, T12F, T11B, and T12B.

Each of the transistors T11F and T12F applies the forward clock signal ECLK_F to the Q-node EQ when the forward start signal EVST_F is input to a gate thereof. The transistor T11F is connected, at the gate thereof, to an input terminal for the forward start signal EVST_F, is connected, at a first electrode thereof, to an input terminal for the forward clock signal ECLK_F, and is connected, at a second electrode thereof, to a first electrode of the transistor T12F. The transistor T12F is connected, at the gate thereof, to the input terminal of the forward start signal EVST_F, is connected, at the first electrode thereof, to the second electrode of the transistor T11F, and is connected, at a second electrode thereof, to the Q-node EQ.

Each of the transistors T11B and T12B applies the backward clock signal ECLK_B to the Q-node EQ when the backward start signal EVST_B is input to a gate thereof. The transistor T11B is connected, at the gate thereof, to an input terminal for the backward start signal EVST_B, is connected, at a first electrode thereof, to an input terminal for the backward clock signal ECLK_B, and is connected, at a second electrode thereof, to a first electrode of the transistor T12B. The transistor T12B is connected, at the gate thereof, to the input terminal of the backward start signal EVST_B, is connected, at the first electrode thereof, to the second electrode of the transistor T11B, and is connected, at a second electrode thereof, to the Q-node EQ.

Here, when continuous inputs are generated at respective gates of the transistors T11F, T12F, T11B, and T12B, the transistors T11F, T12F, T11B, and T12B can be degraded due to threshold voltage shift thereof. To this end, in the clock input circuit CIC according to the aspect(s) of the present disclosure, the forward clock signal ECLK_F is input to the gate of each of the transistors T11F, T12F, T11B, and T12B, and the forward clock signal ECLK_F and the backward clock signal ECLK_B are input to drains of corresponding ones of the transistors T11F, T12F, T11B, and T12B in accordance with the forward or backward start signal EVST_F or EVST_B. Since the clock signals ECLK_F and ECLK_B are continuously input during driving, whereas the start signals EVST_F and EVST_B are input when driving direction is selected, the application time of the start signals EVST_F and EVST_B is shorter than the application time of the clock signals ECLK_F and ECLK_B. Accordingly, it can be possible to reduce degradation of the transistors caused by extended driving of the transistors by connecting the start signals EVST_F and EVST_B having a shorter application time to the gates of the transistors while connecting the clock signals ECLK_F and ECLK_B having a longer application time to the drains of the transistors.

The Q-node discharging circuit QDC can discharge the Q-node EQ at the level of the high drive voltage EVEH at the same timing as that of the start signals EVST_F and EVST_B.

The Q-node discharging circuit QDC can include switches T13_F, T14_F, T14S_F, and T15F configured to discharge the Q-node EQ in forward driving, and switches T13_B, T14_B, T14S_B, and T15B configured to discharge the Q-node EQ in backward driving.

The switches T13_F, T14_F, T14S_F, and T15F configured to discharge the Q-node EQ in forward driving can apply the high drive voltage EVEH to the Q-node EQ in accordance with the forward clock ECLK_F when the forward start signal EVST_F has an off level.

The switch T14F is connected, at a gate and a first electrode thereof, to the forward low voltage EVEL_F while being connected, at a second electrode thereof, to a second electrode of the switch T14SF.

The switch T14SF is connected, at a gate thereof, to the input terminal for the forward start signal EVST_F, is connected, at a first electrode thereof, to the high drive voltage EVEH, and is connected, at the second electrode thereof, to the second electrode of the switch T14F.

The switch T13F is connected, at a gate thereof, to a connection node between the switches T14F and T14SF, is connected, at a first electrode thereof, to the high drive voltage EVEH, and is connected, at a second electrode thereof, to a first electrode of the switch T15F.

The switch T15F is connected, at a gate thereof, to the forward clock ECLK_F, is connected, at the first electrode thereof, to the second electrode of the switch T13F, and is connected, at a second electrode thereof, to the Q-node EQ.

The switches T13_B, T14_B, T14S_B, and T15B configured to discharge the Q-node EQ in backward driving can apply the high drive voltage EVEH to the Q-node EQ in accordance with the backward clock ECLK_B when the backward start signal EVST_B has an off level.

The switch T14B is connected, at a gate and a first electrode thereof, to the backward low voltage EVEL_B while being connected, at a second electrode thereof, to a second electrode of the switch T14SB.

The switch T14SB is connected, at a gate thereof, to the input terminal for the backward start signal EVST_B, is connected, at a first electrode thereof, to the high drive voltage EVEH, and is connected, at the second electrode thereof, to the second electrode of the switch T14B.

The switch T13B is connected, at a gate thereof, to a connection node between the switches T14B and T14SB, is connected, at a first electrode thereof, to the high drive voltage EVEH, and is connected, at a second electrode thereof, to the first electrode of the switch T15B.

The switch T15B is connected, at a gate thereof, to the backward clock ECLK_B, is connected, at the first electrode thereof, to the second electrode of the switch T13F, and is connected, at a second electrode thereof, to the Q-node EQ.

As shown in the waveform diagram of FIG. 8, in forward driving, the forward low voltage EVEL_F is maintained at a low level, and the backward low voltage EVEL_B is maintained at a high level. Accordingly, in forward driving, the switch T14F is always maintained in a turn-on state and, as such, the switch T13F is turned on only in a period in which the switch T14SF is turned off, for example, a period in which the forward start signal EVST_F has an off level, thereby applying the high drive voltage EVEH. Accordingly, the switch T15F can apply the high drive voltage EVEH to the Q-node EQ in accordance with the forward clock ECLK_F.

In backward driving, the backward low voltage EVEL_B is maintained at a low level, and the forward low voltage EVEL_F is maintained at a high level. Accordingly, in backward driving, the switch T14B is always maintained in a turn-on state and, as such, the switch T13B is turned on only in a period in which the switch T14SB is turned off, for example, a period in which the backward start signal EVST_B has an off level, thereby applying the high drive voltage EVEH. Accordingly, the switch T15B can apply the high drive voltage EVEH to the Q-node EQ in accordance with the backward clock ECLK_B.

Through the configuration as described above, the Q-node discharging circuit QDC according to the aspect(s) of the present disclosure can discharge the Q-node EQ at the level of the high drive voltage EVEH at the same timing as that of the start signals EVST_F and EVST_B. As a result, it can be possible to reduce degradation caused by extended driving.

Here, FIG. 8 is a diagram illustrating driving timings of the emission driving circuit of FIG. 7, and illustrates driving waveforms in forward driving.

Referring to FIG. 8, the emission control reset signal ERST can be output in order to reset operation of the emission driving circuit before a frame starts. When the emission control reset signal ERST is applied at a low level, the ninth transistor T9 and the tenth transistor T10 are turned on. The turned-on ninth transistor T9 can apply the high drive voltage EVEH to the Q-node EQ. The turned-on tenth transistor T10 can apply the high drive voltage EVEH to the output terminal for the emission signal EM. Accordingly, the Q-node EQ and the output terminal of the emission signal EM can be discharged at the high drive voltage EVEH.

The high drive voltage EVEH and the low drive voltage EVEL are fixedly supplied to the emission driving circuit. The high drive voltage EVEH and the low drive voltage EVEL are maintained at constant voltage levels, respectively, irrespective of forward driving and backward driving.

The forward low voltage EVEL_F and the backward low voltage EVEL_B are applied in accordance with different driving directions of the emission driving circuit, respectively. In forward driving, the forward low voltage EVEL_F is applied at a low-level voltage, and the backward low voltage EVEL_B is maintained at a high level. Since FIG. 8 illustrates driving waveforms in forward driving, the forward low voltage EVEL_F is shown as being applied as a low-level voltage, and the backward low voltage EVEL_B is shown as being applied at a high level. On the other hand, in backward driving, the backward low voltage EVEL_B is applied as a low-level voltage, and the forward low voltage EVEL_F is maintained at a high level.

Clock signals ECLK1_F, ECLK1_B, ECLK2_F, and ECLK2_B can be signals applied in the form of pulses having predetermined cycles, predetermined signal magnitudes, and predetermined duty ratios, respectively, or signals maintained at a high level. In forward driving, the forward clock signals ECLK1_F and ECLK2_F are applied in the form of pulses, and the backward clock signals ECLK1_B and ECLK2_B are maintained at a high level, for example, an off level. In backward driving, the backward clock signals ECLK1_B and ECLK2_B are applied in the form of pulses, and the forward clock signals ECLK1_F and ECLK2_F are maintained at a high level, for example, an offlevel. Since FIG. 8 illustrates driving waveforms in forward driving, the forward clock signals ECLK1_F and ECLK2_F are applied in the form of pulses, and the backward clock signals ECLK1_B and ECLK2_B are maintained at a high level, for example, an off level.

When each of the clock signals ECLK1_F, ECLK1_B, ECLK2_F, and ECLK2_B alternates between a first level (for example, a low level) and a second level (for example, a high level) while being applied in the form of pulses, a sum of a period in which the first level is maintained and a period in which the second level is maintained can be referred to as "one cycle". The first clock signals ECLK1_F and ECLK1_B and the second clock signals ECLK2_F and ECLK2_B can be input to each odd stage and each even stage, respectively. The number of clock signals can be varied in accordance with a driving method of the emission control driver.

Each of the forward start signal EVST_F and the backward start signal EVST_B is a pulse signal having a predetermined cycle and a predetermined magnitude. With reference to one cycle (1H) in which the clock signals ECLK1 and ECLK2 maintain a constant value, the forward start signal EVST_F or the backward start signal EVST_B can be supplied for a period of two cycles (2H). In forward driving, the forward start signal EVST_F is applied at a low-level voltage, and the backward start signal EVST_B is maintained at a high level. Since FIG. 8 illustrates driving waveforms in forward driving, the forward start signal EVST_F is shown as being applied in the form of a low-level pulse, and the backward start signal EVST_B is shown as being maintained at a high level. On the other hand, in backward driving, the backward start signal EVST_B can be applied in the form of a low-level pulse, and the forward start signal EVST_F can be maintained at a high level.

Next, voltage variations of the QB-node EQB, the Q-node EQ, and an EM-node, which are included in the emission driving circuit, will be described. When the forward start signal EVST_F is input at a low level, and the forward clock signal ECLK1_F transitions to a low level, the QB-node EQB is discharged at a high level, and the Q-node EQ and the output terminal for the emission signal EM, for example, the EM-node, are charged at a low level.

As the forward start signal EVST_F is input at a low level for a period of 2H, the Q-node EQ and the output terminal for the emission signal EM, for example, the EM-node, are charged at a low level for a period of 2H and, as such, an emission signal EM of a turn-on level can be output.

A driving method of the emission driving circuit according to the aspect(s) of the present disclosure having the above-described configuration(s) will be described with reference to FIGS. 9A to 14.

Particularly, FIGS. 9A to 14 illustrate a driving method of the emission driving circuit in forward driving. In accordance with the driving method, the forward low voltage EVEL_F is fixedly supplied at a low level, and the backward low voltage EVEL_B is fixedly supplied at a high level. In addition, the backward start signal EVST_B and the backward clock signal ECLK_B for backward driving are also maintained at a high level. Accordingly, all of the transistors controlled by the backward start signal EVST_B and the backward clock signal ECLK_B input to the gates thereof are maintained in an off state and, as such, description of configurations associated therewith will be omitted. In the following description, a turn-on level can mean or represent a low level, and a turn-off level can mean or represent a high level.

Figure 9A:
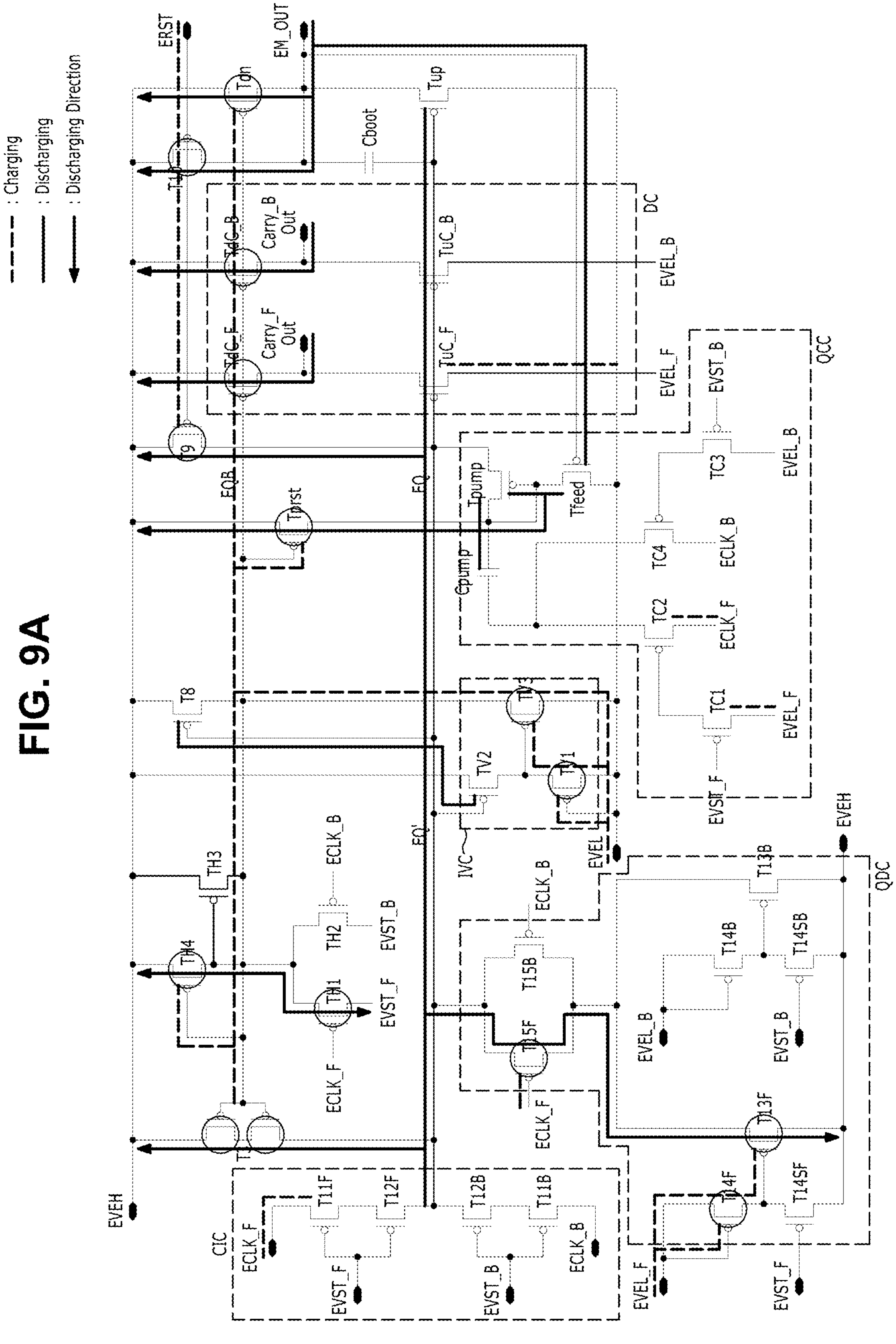
FIGS. 9A to 14 are diagrams for explaining a driving method of the emission driving circuit included in the gate driver according to the aspect(s) of the present disclosure.
Figure 9B:
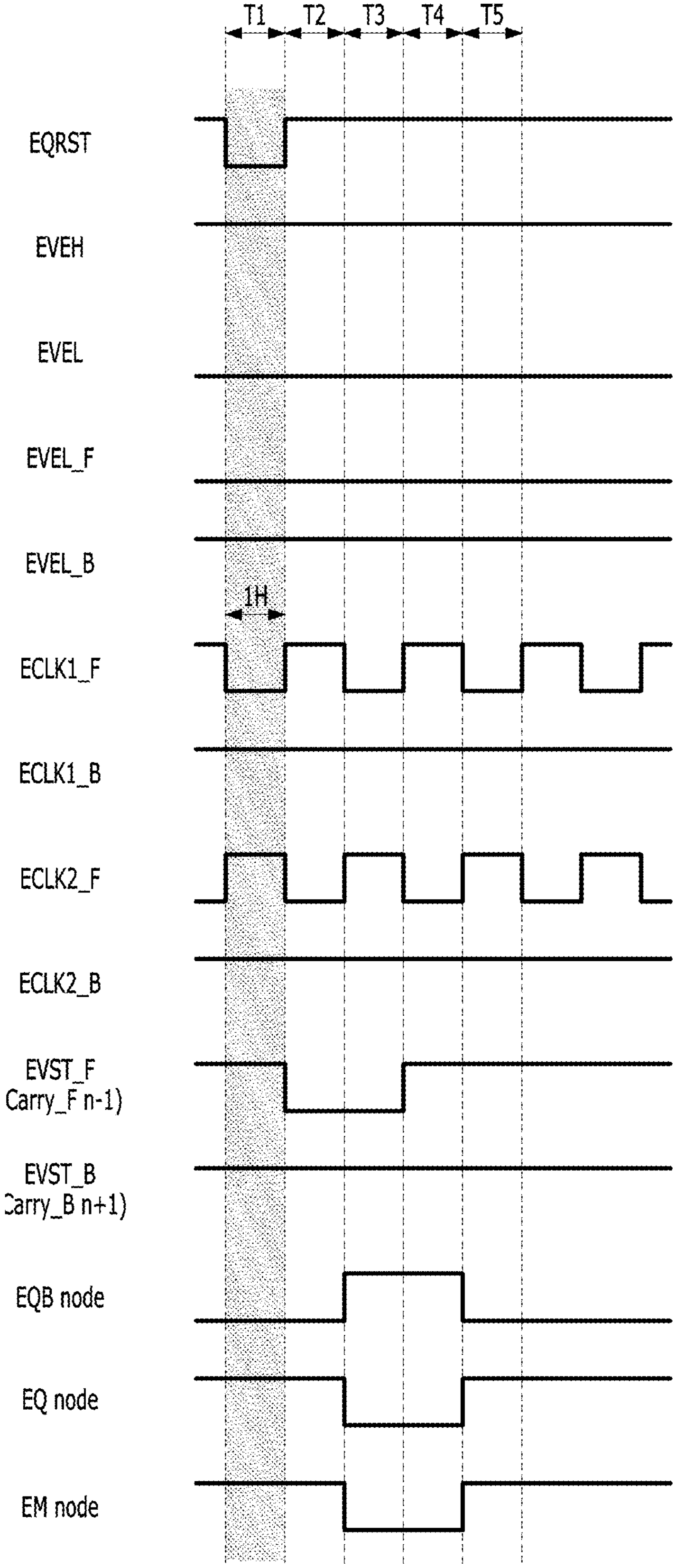

More specifically, FIGS. 9A and 9B show respectively a driving method and driving waveforms of the emission driving circuit in a first period T1.

Referring to FIGS. 9A and 9B, in the first period T1, the Q-node EQ, the emission signal output node, and the carry signal output node can be discharged at a high level.

In the first period T1, the emission driving circuit can be driven to discharge the Q-node EQ, the EM-node, and the carry node at a high level. When an emission control reset signal ERST of a turn-on level is supplied in the first period T1, the ninth transistor T9 and the tenth transistor T10 are turned on and, as such, the high drive voltage EVEH can be supplied to the Q-node EQ and the output terminal for the emission signal EM.

In the inverter circuit IVC, the first inverting transistor TV1 is always maintained in a turn-on state by the low drive voltage EVEL, and applies the low drive voltage EVEL to the third inverting transistor TV3. Accordingly, the third inverting transistor TV3 is turned on and, as such, the QB-node EQB maintains the low drive voltage EVEL. When the voltage of the Q-node EQ has a high level, the second inverting transistor TV2 is turned off. On the other hand, the third inverting transistor TV3 is turned on by the turned-on first inverting transistor TV1. The turned-on third inverting transistor TV3 supplies the low drive voltage EVEL to the QB-node EQB.

As a result, the Q-node EQ is maintained at a high level, and the QB-node EQB is maintained at a low level, and, as such, an emission signal EM of a turn-off level can be output.

In the Q-node discharging circuit QDC, the transistor T14F is always maintained in a turn-on state by the forward low voltage EVEL_F, and the transistor T13F is turned on only in a period in which the transistor T14SF is turned off, for example, a period in which the forward start signal EVST_F has an off level, thereby applying the high drive voltage EVEH. In the first period T1, the transistor T15F can apply the high drive voltage EVEH to the Q-node EQ because the forward clock signal ECLK_F is supplied at a low voltage, for example, a turn-on level. Accordingly, the Q-node can be discharged at the level of the high drive voltage EVEH.

Figure 10A:
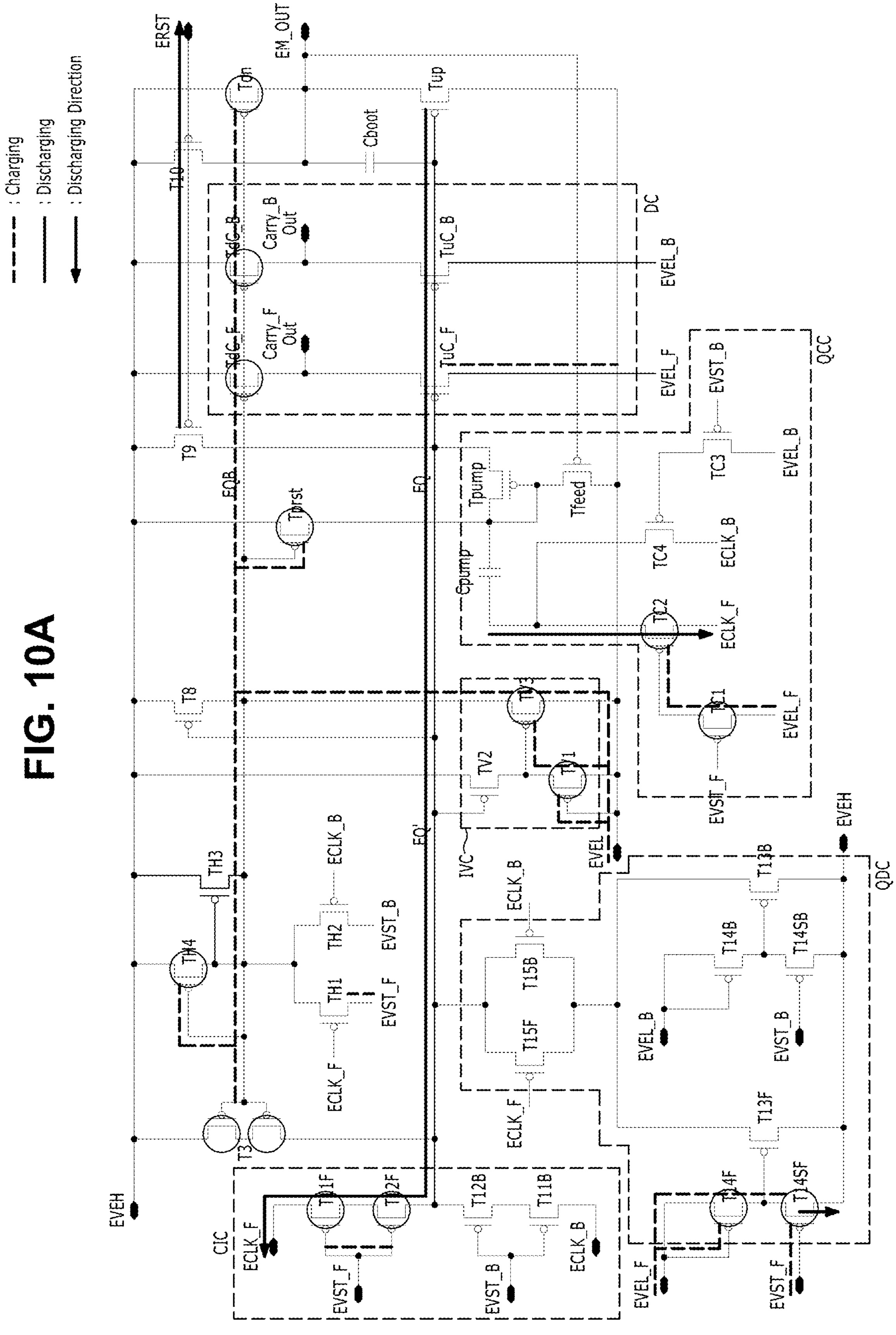
Figure 10B:
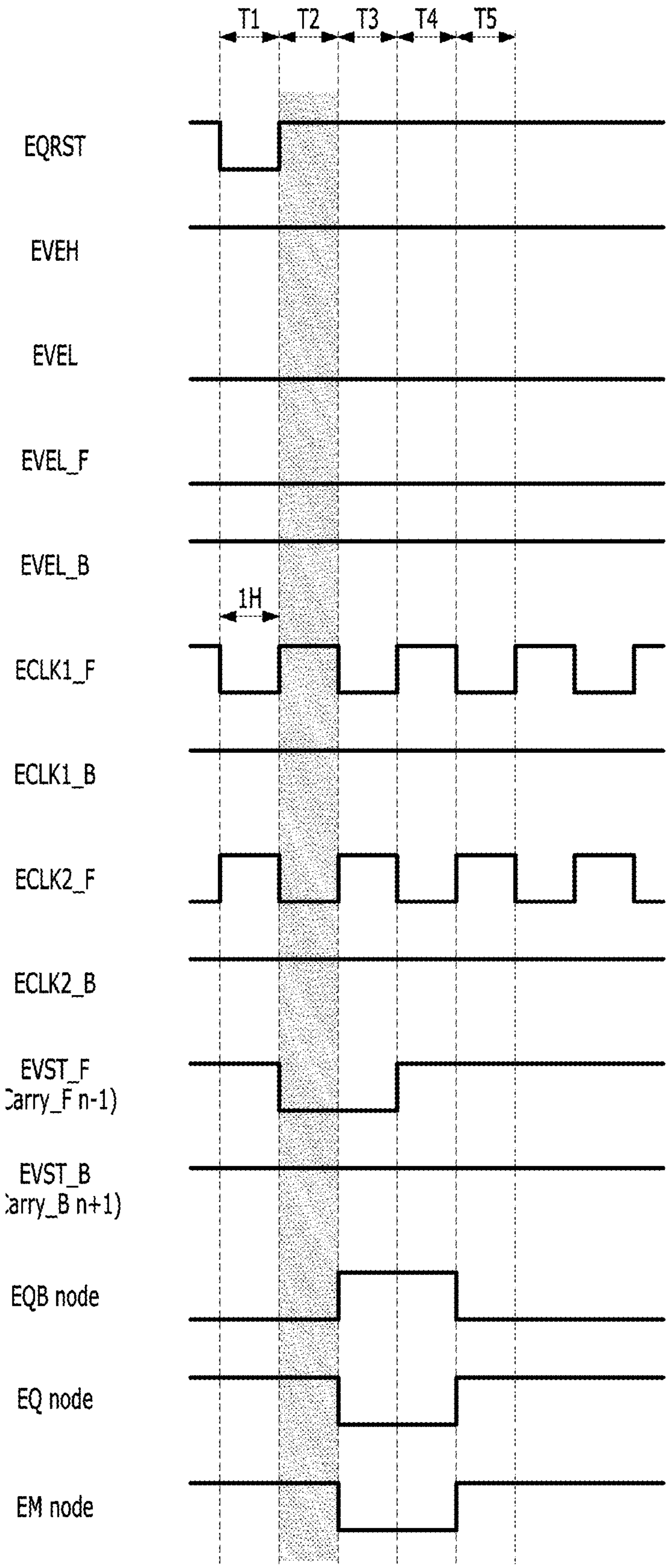

FIGS. 10A and 10B show respectively a driving method and driving waveforms of the emission driving circuit in a second period T2.

Referring to FIGS. 10A and 10B, in the second period T2, the QB-node EQB can be maintained in a state of having been charged at a low level.

In the second period T2, the forward start signal EVST_F is applied at a low level, for example, a turn-on level, and the forward clock signal ECLK_F is applied at a high level, for example, an off level.

As the forward start signal EVST_F is applied at a low level, for example, a turn-on level, the clock input circuit CIC applies the forward clock signal ECLK_F to the Q-node EQ.

In the Q-node discharging circuit QDC, the transistor T14F is turned on and, as such, the transistor T13F is turned off by the high drive voltage EVEH. Accordingly, the high drive voltage EVEH, which has been applied to the Q-node EQ, is cut off.

In the Q-node charging circuit QCC, the transistor TC1 applies the forward low voltage EVEL_F to the gate of the transistor TC2 when the forward start signal EVST_F is input to the gate thereof. The transistor TC2 applies the forward clock signal ECLK_F to the pump capacitor Cpump when the forward low voltage EVEL_F is input to the gate thereof.

Figure 11A:
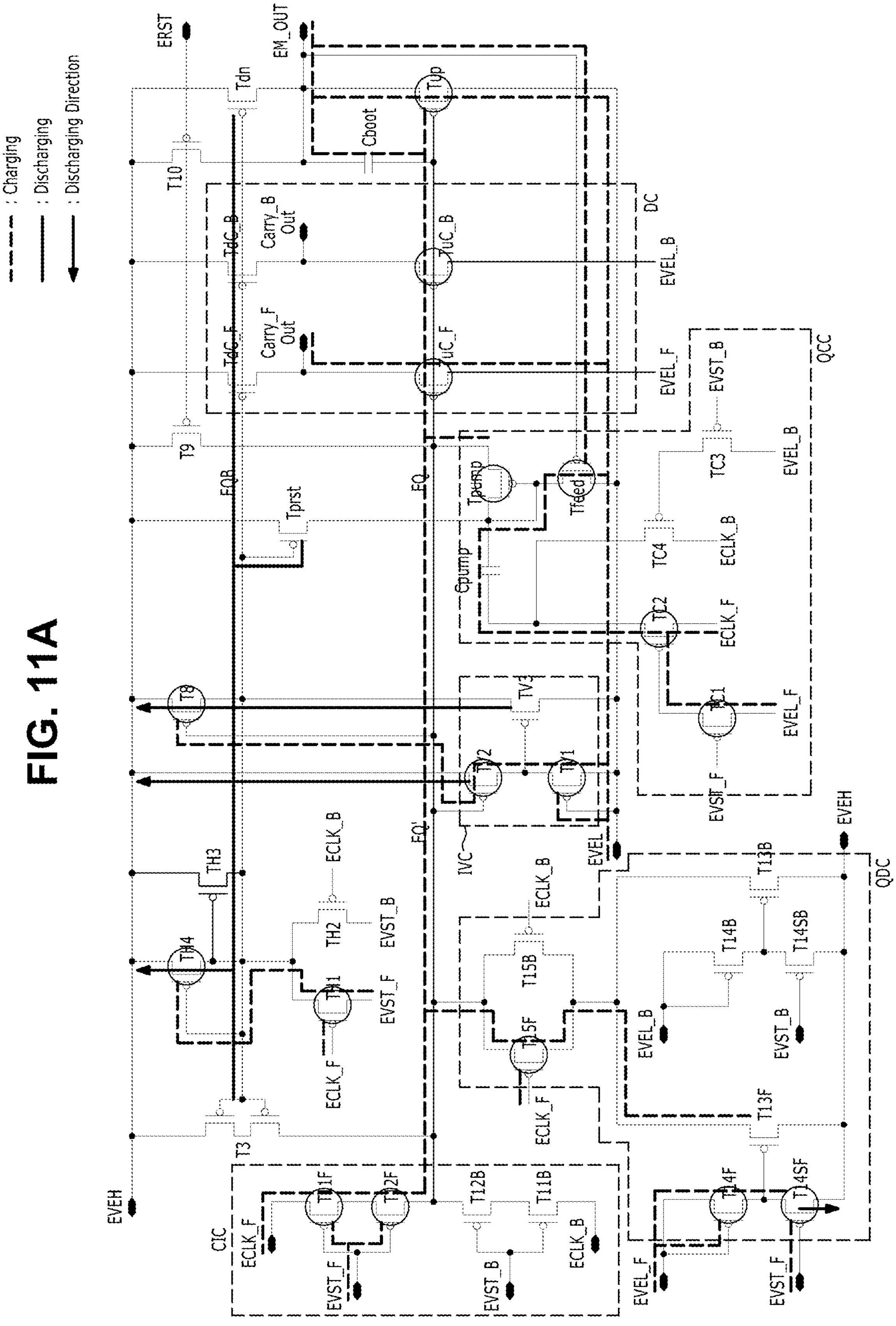
Figure 11B:
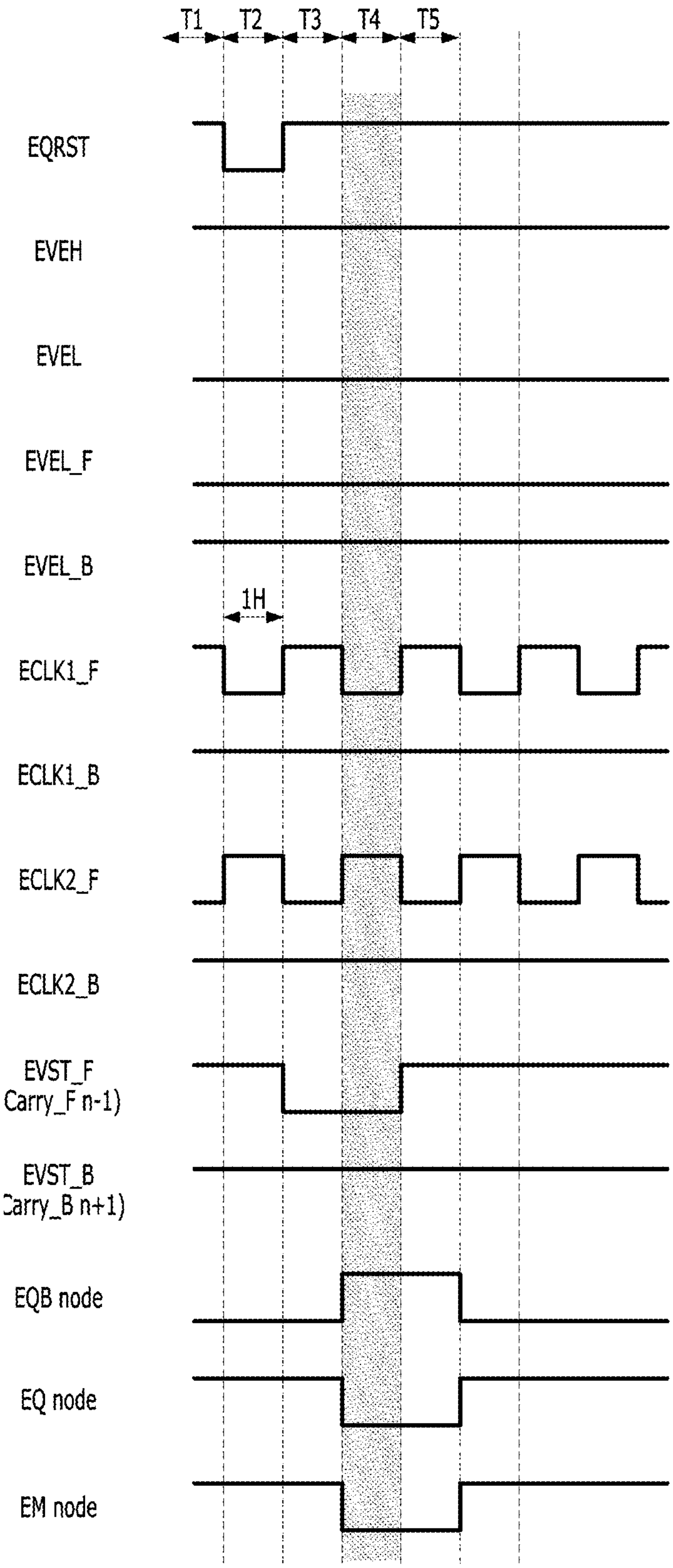

FIGS. 11A and 11B show respectively a driving method and driving waveforms of the emission driving circuit in a third period T3.

Referring to FIGS. 11A and 11B, in the third period T3, the Q-node EQ is charged at a low level and, as such, an emission signal EM of a turn-on level and a carry signal Carry_F are output. In addition, the pump capacitor Cpump is charged and, as such, the Q-node EQ is boosted. The QB-node EQB is discharged at a high level.

In the third period T3, the forward start signal EVST_F and the forward clock signal ECLK_F are applied at a low level, for example, a turn-on level.

As the forward start signal EVST_F is applied at a low level, for example, a turn-on level, the clock input circuit CIC applies the forward clock signal ECLK_F to the Q-node EQ.

In the Q-node discharging circuit QDC, the transistor T13F is turned off by the high drive voltage EVEH because the transistor T14SF is turned on. Accordingly, the high drive voltage EVEH, which has been applied to the Q-node EQ, is cut off.

When the forward start signal EVST_F is input to the gate of the transistor TC1 in the Q-node charging circuit QCC, the transistor TC1 applies the forward low voltage EVEL_F to the gate of the transistor TC2. The transistor TC2 applies the forward clock signal ECLK_F to the pump capacitor Cpump when the forward low voltage EVEL_F is input to the gate thereof. Since the forward clock signal ECLK_F is applied at a low level, the pump capacitor (Cpump) node is charged.

As the Q-node EQ is charged at a low level, the forward pull-up carry transistor TuC_F for output of the forward carry signal and the pull-up transistor Tup for output of an emission signal EM can be turned on. Accordingly, a carry signal Carry having a turn-on level and an emission signal EM of a turn-on level can be output.

When the emission signal EM of the turn-on level is output, the feed transistor Tfeed can be turned on. When the feed transistor Tfeed is turned on, the low drive voltage EVEL can be applied to the gate node of the pump transistor Tpump. The voltage level of the low drive voltage EVEL can be a level for turning on the pump transistor Tpump. As the pump transistor Tpump is turned on, the pump capacitor Cpump can be electrically connected to the Q-node EQ. For example, the pump capacitor Cpump and the Q-node EQ can be coupled to each other. Since the forward clock signal ECLK_F is input at a low level in this case, the Q-node EQ can be boosted. During a period in which the emission signal EM of the turn-on level is output, the voltage level of the Q-node EQ can be stably maintained at a level for turning on the pull-up transistor Tup. As a result, output of the emission signal EM of the turn-on level can be stably maintained during an emission period.

When the Q-node EQ has a low voltage, the inverter circuit IVC can supply the high voltage VGH to the QB-node EQB and maintain the QB-node EQB at the high voltage VGH, together with the eighth transistor T8 to be connected the input terminal for the high drive voltage EVEH and the QB-node EQB. Accordingly, the QB-node EQB can be maintained in a state of having been discharged at a high level.

Figure 12A:
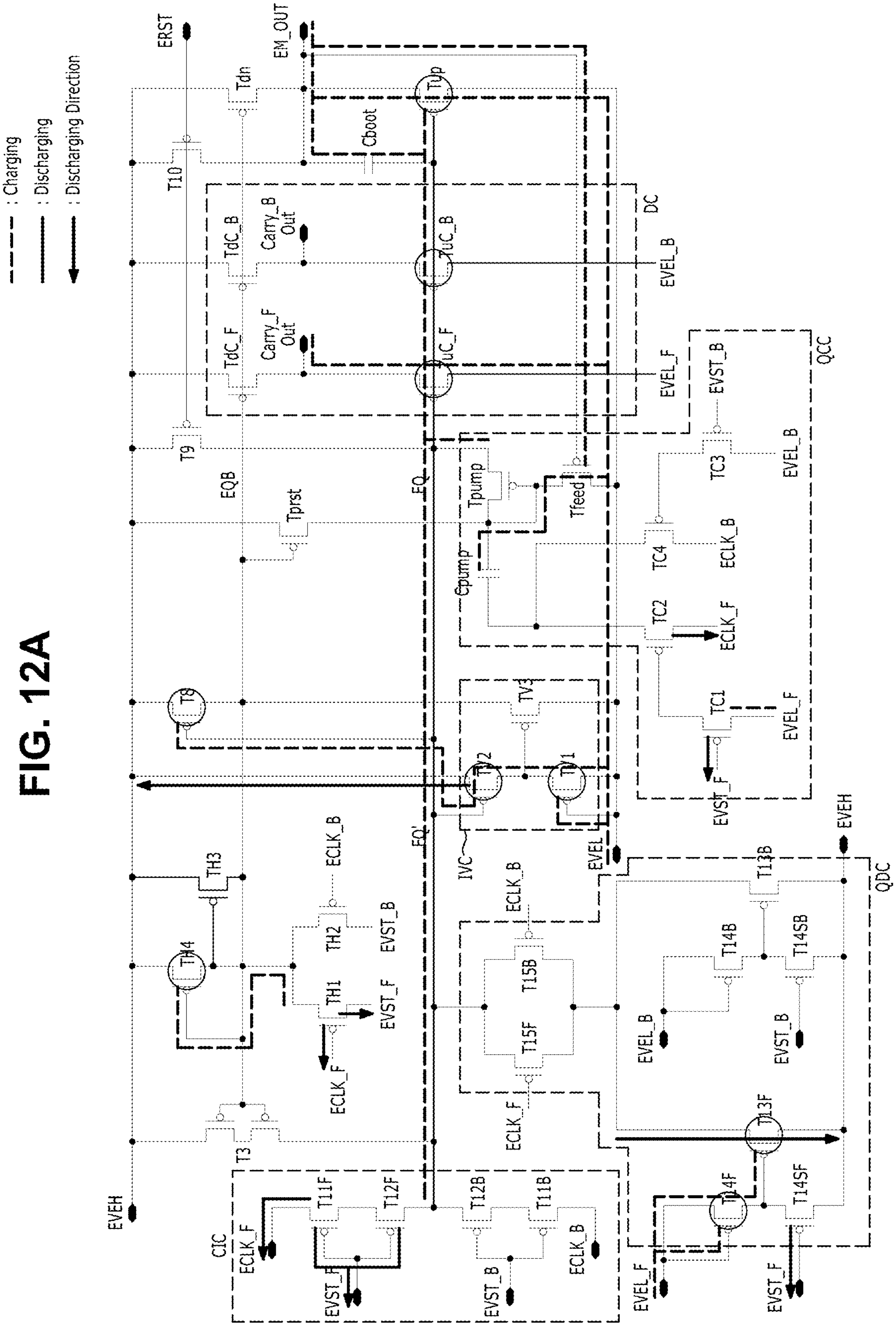
Figure 12B:
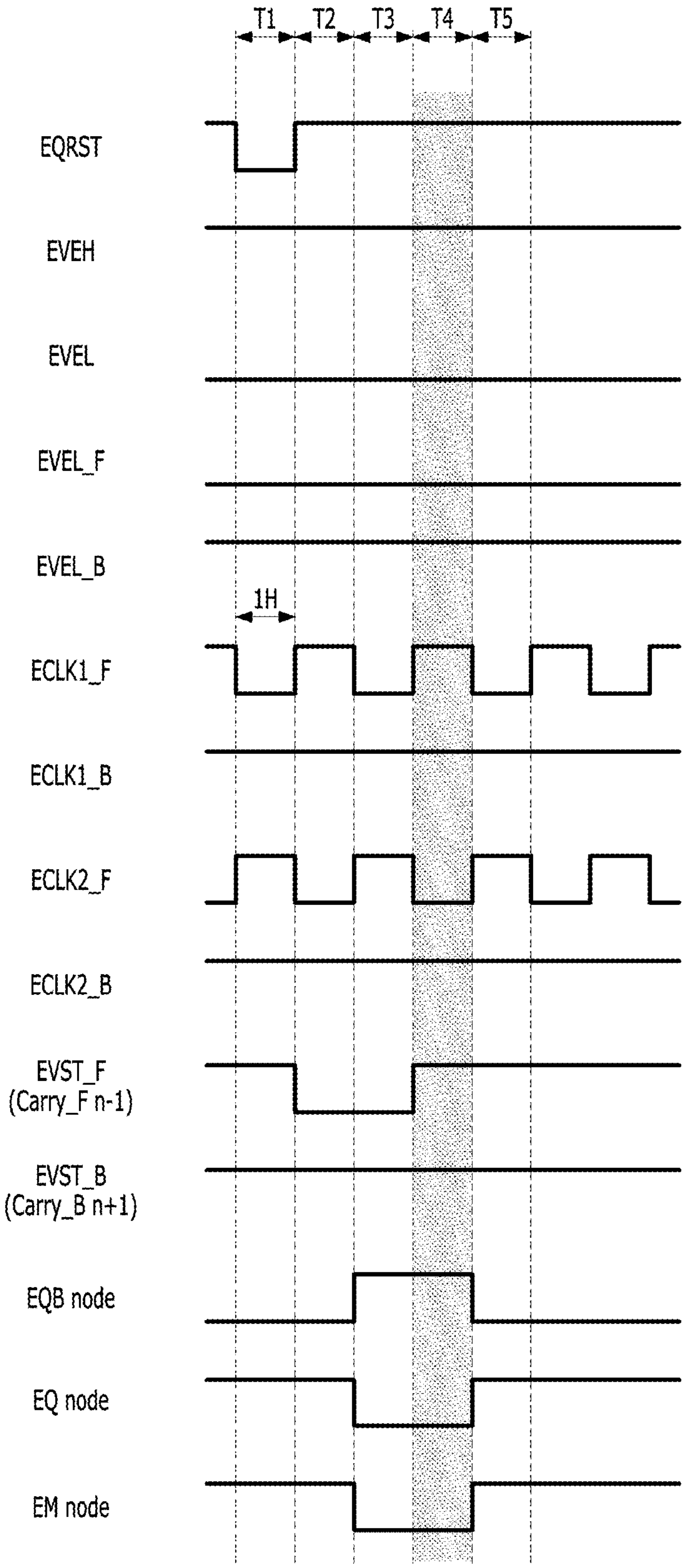

FIGS. 12A and 12B respectively show a driving method and driving waveforms of the emission driving circuit in a fourth period T4.

Referring to FIGS. 12A and 12B, in the fourth period T4, both the forward start signal EVST_F and the forward clock signal ELCK_F transition to a high level, for example, an off level, but the Q-node EQ is maintained at a low level. Accordingly, the emission signal EM and the carry signal Carry_F are output.

In the fourth period T4, the Q-node EQ is maintained in a state of having been charged at a low level, whereas the QB-node EQB is maintained in a state of having been discharged at a high level.

As the forward start signal EVST_F is applied at a high level, for example, an off level, input thereof from the clock input circuit CIC is cut off.

In the Q-node discharging circuit QDC, the transistor T15F is turned off in accordance with input of the forward clock signal ECLK_F of the off level. Accordingly, application of the high drive voltage EVEH to the Q-node EQ is prevented.

The transistor TC1 in the Q-node charging circuit QCC is turned off by the forward start signal EVST_F of the off level and, as such, the transistor TC2 is also turned off. Accordingly, an input to the pump capacitor Cpump is cut off.

As the Q-node EQ is maintained in a state of having been charged at a low level, the forward pull-up carry transistor TuC_F for output of the forward carry signal and the pull-up transistor Tup for output of the emission signal EM can be turned on. Accordingly, a carry signal Carry having a turn-on level and an emission signal EM of a turn-on level can be output.

When the emission signal EM of the turn-on level is output, the feed transistor Tfeed can be turned on. When the feed transistor Tfeed is turned on, the low drive voltage EVEL can be applied to the gate node of the pump transistor Tpump. As a result, the pump transistor Tpump is turned on and, as such, the pump capacitor Cpump can be coupled to the Q-node EQ. Accordingly, the Q-node EQ can be maintained at a low level and, as such, the emission signal EM and the carry signal Carry_F can be output.

When the Q-node EQ has a low voltage, the inverter circuit IVC can maintain the QB-node EQB in a state of having been discharged at a high level, together with the eighth transistor T8 connected the input terminal for the high drive voltage EVEH and the QB-node EQB.

Figure 13A:
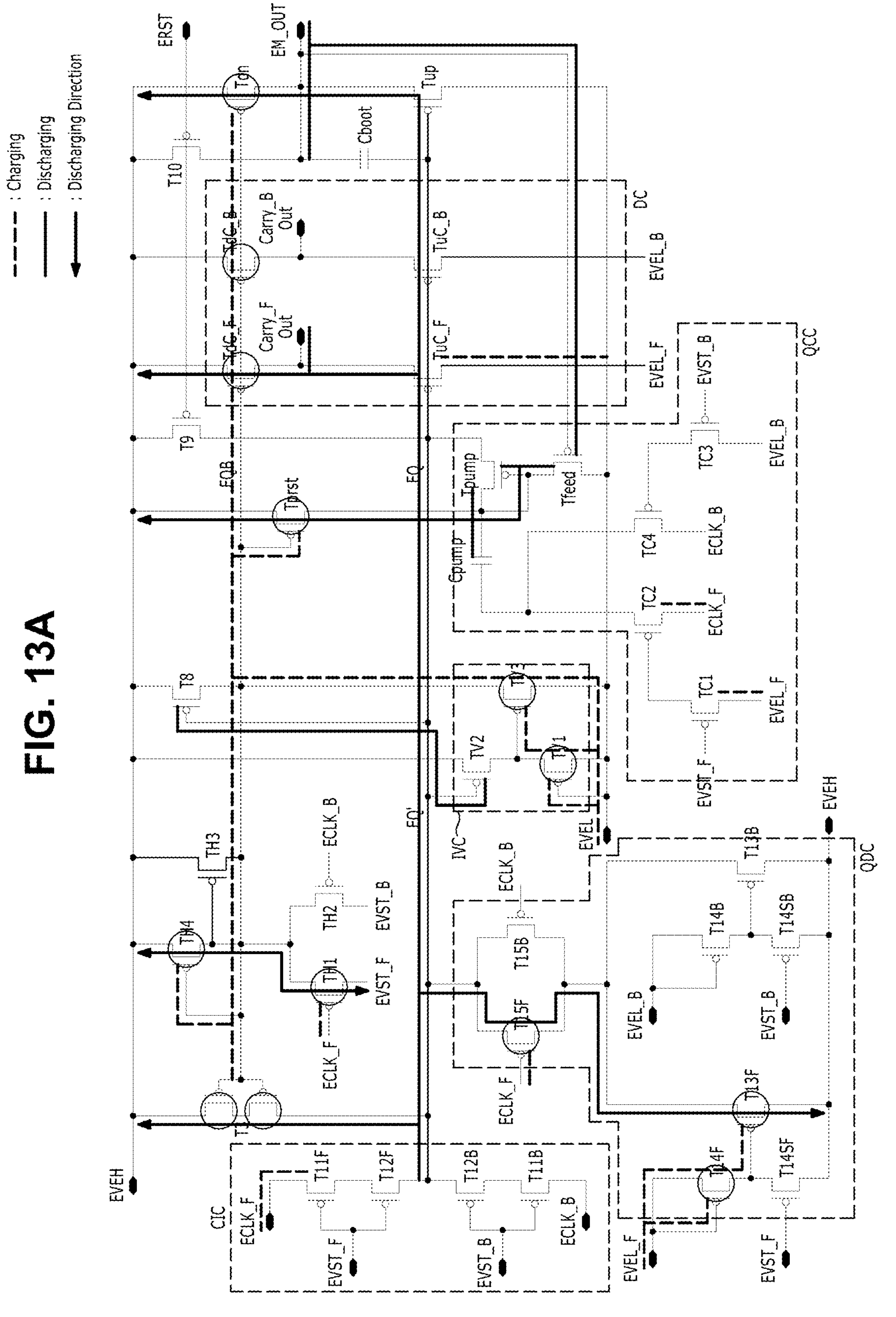
Figure 13B:
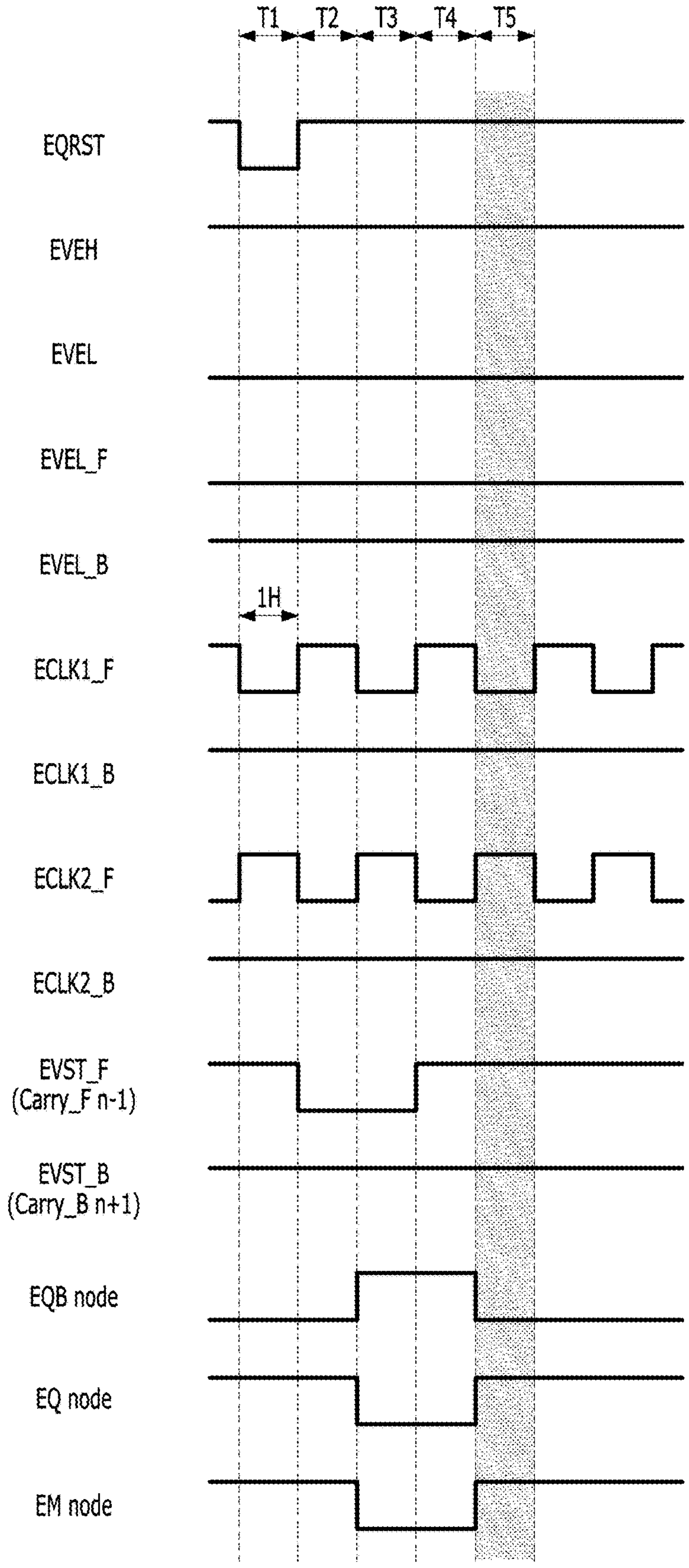

FIGS. 13A and 13B show respectively a driving method and driving waveforms of the emission driving circuit in a fifth period T5.

Referring to FIGS. 13A and 13B, in the fifth period T5, the Q-node EQ is discharged at a high level, and the QB-node EQB is charged at a low level, and, as such, an emission signal EM of a turn-off level and a carry signal Carry_F of a turn-off level are output.

In the fifth period T5, the forward clock signal ECLK_F transitions to a low level, for example, a turn-on level.

In the Q-node discharging circuit QDC, the transistor T14F is always maintained in a turn-on state by the forward low voltage EVEL_F, and the transistors T13F and T15F are turned on because the forward start signal EVST_F has an off level. Accordingly, the Q-node EQ can be discharged at the level of the high drive voltage EVEH.

In the inverter circuit IVC, the first inverting transistor TV1 is always maintained in a turn-on state by the low drive voltage EVEL, and applies the low drive voltage EVEL to the gate of the third inverting transistor TV3. Accordingly, the third inverting transistor TV3 is turned on, thereby causing the QB-node EQB to maintain the low drive voltage EVEL. When the Q-node EQ has a high voltage, the second inverting transistor TV2 is turned off. The third inverting transistor TV3 is turned on by the turned-on first inverting transistor TV1. The turned-on third inverting transistor TV3 supplies the low drive voltage EVEL to the QB-node EQB.

Accordingly, the Q-node EQ is maintained at a high level, and the QB-node EQB is maintained at a low level, and, as such, an emission signal EM of a turn-off level can be output.

Figure 14:
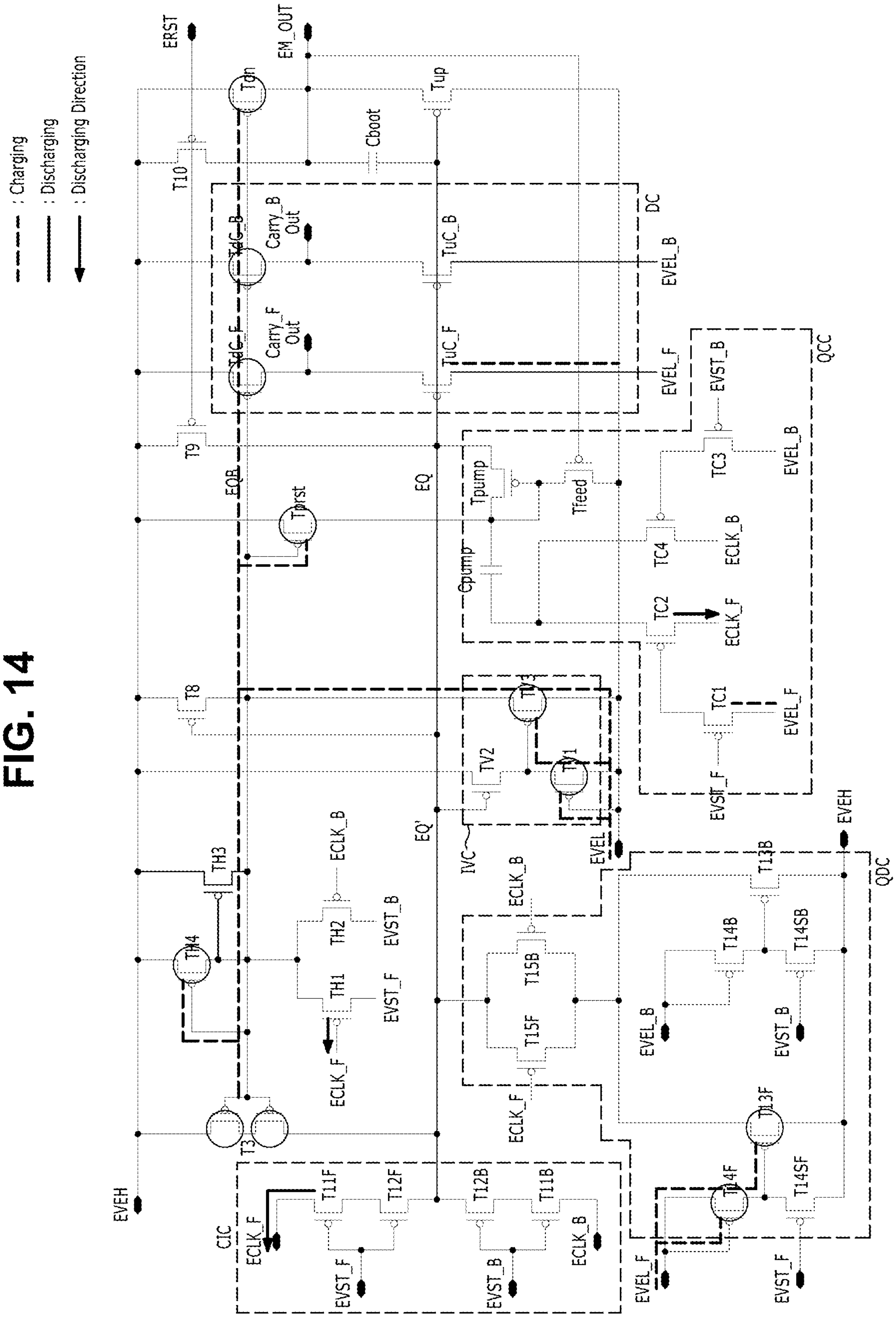

FIG. 14 shows a driving method of the emission driving circuit after the fifth period T5.

Referring to FIG. 14, after the fifth period T5, the Q-node EQ is maintained at a high level, and the QB-node EQB is maintained at a low level. Accordingly, even when the clock signal ECLK is input, a carry signal of an off level and an emission signal EM of an off level can be supplied.

Heretofore, the driving method of the emission driving circuit according to the aspect(s) of the present disclosure has been described with reference to FIGS. 9A to 14 illustrating a driving method of the emission driving circuit in forward driving in which the emission driving circuit is sequentially driven from the first stage GS1 to the N-th stage GS(N), thereby outputting an emission signal EM.

Of course, it can be possible to output an emission signal EM in a backward direction from the N-the stage GS(N) to the first stage GS1 by maintaining the forward low voltage EVEL_F at a high level, maintaining the backward low voltage EVEL_B at a low level, applying a backward start signal EVST_B having a low voltage, and applying a backward clock signal ECLK_B.

Figure 15:
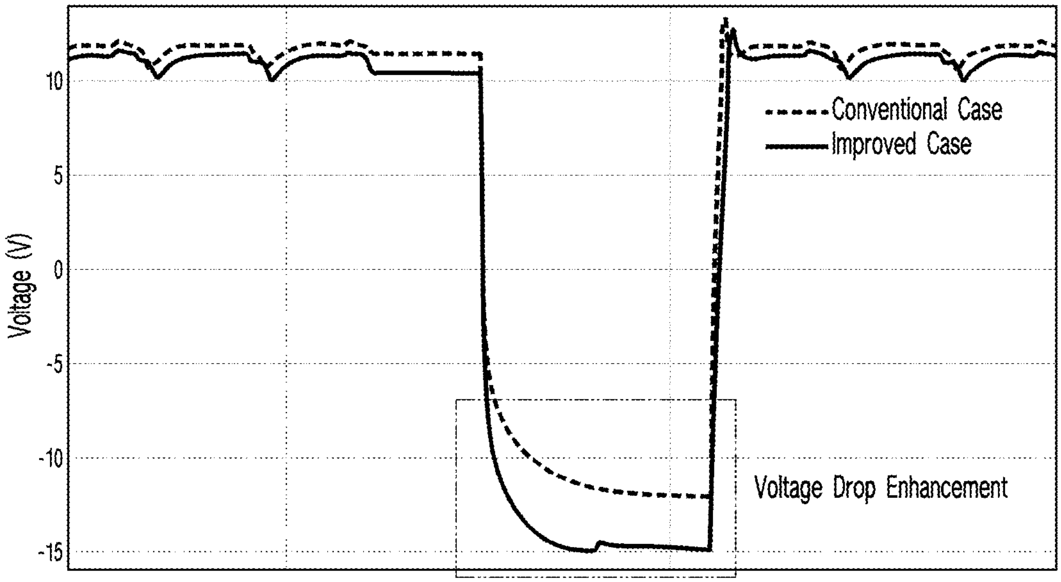
FIG. 15 is graphs of results of simulation of emission driving circuits respectively included in the gate driver according to the aspect(s) of the present disclosure and a gate driver according to a comparative example.
Figure 15:
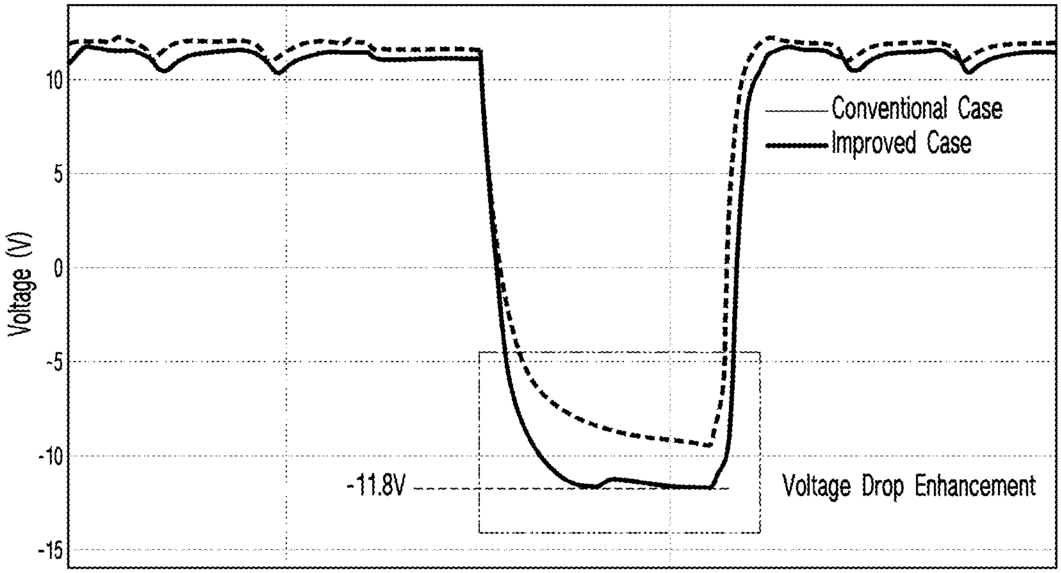

FIG. 15 shows results of simulation of voltage variation of a Q-node and output voltage variation of an emission signal in a gate driver according to an aspect of the present disclosure and a comparative example. An emission driving circuit can be degraded after extended driving in a high-temperature environment and, as such, a voltage of a Q-node and a voltage of an emission signal can rise. Particularly FIG. 15 shows examples of the results of simulation of voltage variation of the Q-node and output voltage variation of the emission signal in each of a related art emission driving circuit and an emission driving circuit according to an aspect of the present disclosure under the same high-temperature extended driving conditions.

Referring to FIG. 15, in accordance with the results of simulation of a Q-node voltage variation, the voltage of the Q-node in the emission driving circuit according to the aspect(s) of the present disclosure was measured to be lower than that of the related art emission driving circuit. For example, it can be seen that, in the emission driving circuit according to the aspect(s) of the present disclosure, an output voltage of an emission signal EM rises in accordance with an enhancement in voltage drop, as compared to the related art emission driving circuit.

In accordance with results of simulation of output voltage variation of the EM signal, an enhancement in voltage drop is achieved in the emission driving circuit according to the aspect(s) of the present disclosure, as compared to the related art emission driving circuit. In in the emission driving circuit according to the aspect(s) of the present disclosure, accordingly, the output voltage of the emission signal EM was measured to be −11.8 V that is substantially equal to an input voltage of −12 V.

From the above description, it can be seen that, in the emission driving circuit according to the aspect(s) of the present disclosure, the voltage of the Q-node and the voltage of the emission signal EM can be maintained to be lower than those of the related art emission driving circuit, in extended driving in a high-temperature environment, and, as such, degradation which may be caused by extended driving can be reduced, as compared to the related art emission driving circuit.

The emission driving circuit according to the aspect(s) of the present disclosure includes both a transistor configured to output a forward carry signal and a transistor configured to output a backward carry signal and, as such, it can be possible to reduce or minimize degradation which may be caused by extended driving, as compared to a circuit configured to output a carry signal to a single carry signal output terminal irrespective of driving directions.

In accordance with aspects of the present disclosure, a circuit for selecting forward driving or backward driving is configured to input a start signal having a relatively low use frequency to a gate of a transistor while inputting a clock signal having a relatively high use frequency to a drain of a transistor and, as such, it can be possible to reduce or avoid degradation of the circuit for selecting forward driving or backward driving.

In accordance with aspects of the present disclosure, it can be possible to enhance characteristics of the Q-node and the emission signal through application of a structure configured to discharge the Q-node in the same time period as that of a forward or backward start signal.

As apparent from the above description, aspects of the present disclosure have the following effects.

In accordance with aspects of the present disclosure, it can be possible to provide a gate driving circuit and a display device which are capable of reducing, minimizing or preventing degradation of the gate driving circuit caused by extended driving.

In accordance with aspects of the present disclosure, two carry signal output terminals are provided in a gate driving circuit capable of being bidirectionally driven such that the carry signal output terminals are separately used in accordance with driving directions. Accordingly, degradation of a switch configured to output a carry signal can be reduced or minimized.

In accordance with aspects of the present disclosure, a circuit for selecting forward driving or backward driving is configured to input a start signal having a relatively low use frequency to a gate of a transistor while inputting a clock signal having a relatively high use frequency to a drain of a transistor and, as such, it can be possible to reduce or minimize degradation of the circuit for selecting forward driving or backward driving.

In accordance with aspects of the present disclosure, it can be possible to enhance characteristics of the Q-node and the emission signal through application of a structure configured to discharge the Q-node.

Effects according to the exemplary aspects of the disclosure are not limited to the above-illustrated contents, and more various effects can be included in the disclosure.

Although the foregoing description has been given mainly in conjunction with aspects, these aspects are only illustrative without limiting the disclosure. Those skilled in the art to which the present disclosure pertains can appreciate that various modifications and applications illustrated in the foregoing description can be possible without changing essential characteristics of the aspects. Therefore, the above-described aspects should be understood as exemplary rather than limiting in all aspects. In addition, the scope of the present disclosure should also be interpreted by the claims below rather than the above detailed description. All modifications or alterations as would be derived from the equivalent concept intended to be included within the scope of the present disclosure should also be interpreted as falling within the scope of the disclosure.

What is claimed is:

1. A display device comprising:

a display panel including a plurality of sub-pixels disposed therein; and a gate driving circuit configured to output a gate signal to the plurality of sub-pixels, wherein the gate driving circuit comprises:

a pull-up transistor controlled by a voltage level of a Q-node;

a pull-down transistor configured by a voltage level of a QB-node;

a dual carry circuit configured to output a forward carry signal in accordance with the voltage levels of the Q-node and the QB-node in forward driving thereof, and output a backward carry signal in accordance with the voltage levels of the Q-node and the QB-node in backward driving thereof; and a clock input circuit configured to apply a forward clock signal to the Q-node when a forward start signal is input thereto, and apply a backward clock signal to the Q-node when a backward start signal is input thereto, wherein the gate driving circuit further comprises:

a Q-node discharging circuit configured to discharge the Q-node in accordance with a forward clock signal when the forward start signal is input at an off level in the forward driving, and discharge the Q-node in accordance with the backward clock signal when the backward start signal is input at an off level in the backward driving, wherein the Q-node discharging circuit comprises:

a first Q-node discharge circuit including a first forward discharge transistor, a first forward sub-discharge transistor, a second forward discharge transistor, and a third forward discharge transistor, and a second Q-node discharge circuit including a first backward discharge transistor, a first backward sub-discharge transistor, a second backward discharge transistor, and a third backward discharge transistor, wherein the forward driving in which a forward low voltage is maintained at a low level and a backward low voltage is maintained at a high level, the first forward discharge transistor is turned on, the first forward sub-discharge transistor is turned off, and the second forward discharge transistor is turned on in response to a period in which the forward start signal is at an off level and a high driving voltage is applied, so that the third forward discharge transistor operates to apply the high driving voltage to the Q-node in accordance with the forward clock signal, and wherein the backward driving in which the forward low voltage is maintained at the high level, the first backward discharge transistor is turned on, the first backward sub-discharge transistor is turned off, and the second backward discharge transistor is turned on in response to a period in which the backward start signal is at an off level, and the high driving voltage is applied, so that the third backward discharge transistor operates to apply the high driving voltage to the Q-node in accordance with the backward clock signal.

2. The display device according to claim 1, wherein the dual carry circuit comprises:

a first pull-up carry transistor controlled by the voltage level of the Q-node, and configured to output the forward carry signal;

a second pull-up carry transistor controlled by the voltage level of the Q-node, and configured to output the backward carry signal;

a first pull-down carry transistor controlled by the voltage level of the QB-node, and configured to output a high drive voltage; and a second pull-down carry transistor controlled by the voltage level of the QB-node, and configured to output the high drive voltage.

3. The display device according to claim 2, wherein the first pull-up carry transistor is controlled by the voltage level of the Q-node, and configured to output the forward low voltage as the forward carry signal.

4. The display device according to claim 2, wherein the second pull-up carry transistor is controlled by the voltage level of the Q-node, and configured to output the backward low voltage as the backward carry signal.

5. The display device according to claim 1, wherein the clock input circuit comprises:

a first transistor circuit configured to apply the forward clock signal to the Q-node when the forward start signal is input thereto; and a second transistor circuit configured to apply the backward clock signal to the Q-node when the backward start signal is input thereto.

6. The display device according to claim 5, wherein the first transistor circuit comprises at least one transistor; and wherein the at least one transistor comprises:

a gate to which the forward start signal is input;

a drain to which the forward clock signal is input; and a source connected to the Q-node.

7. The display device according to claim 5, wherein the second transistor circuit comprises at least one transistor; and wherein the at least one transistor comprises:

a gate to which the backward start signal is input;

a drain to which the backward clock signal is input; and a source connected to the Q-node.

8. The display device according to claim 1, wherein the display panel comprises a substrate on which the gate driving circuit is disposed at least one in number among pixel areas of the plurality of sub-pixels.

9. The display device according to claim 1, wherein each of the plurality of sub-pixels comprises:

a light emitting element;

a driving transistor configured to supply a drive current to the light emitting element; and a plurality of switching transistors configured to control driving timing of the driving transistor and the light emitting element, and wherein the gate signal is supplied to control, among the plurality of switching transistor, a switching transistor configured to control a turn-on period of the light emitting element.

10. The display device according to claim 1, wherein the clock input circuit comprises:

a first clock input circuit including a first forward transistor having a gate electrode connected to an input terminal of the forward start signal and a first electrode connected to an input terminal of the forward clock signal, and a second forward transistor having a gate electrode connected to the input terminal of the forward start signal, a first electrode connected to a second electrode of the first forward transistor and a second electrode connected to the Q-node, and a second clock input circuit including a first backward transistor having a gate electrode connected to an input terminal of the backward start signal and a first electrode connected to an input terminal of the backward clock signal, and a second backward transistor having a gate electrode connected to the input terminal of the backward start signal, a first electrode connected to a second electrode of the first backward transistor and a second electrode connected to the Q-node.

11. The display device according to claim 1, wherein the first forward discharge transistor has a gate electrode and a first electrode connected to a forward low voltage, a second electrode connected to a second electrode of the first forward sub-discharge transistor, the first forward sub-discharge transistor has a gate electrode connected to an input terminal for the forward start signal, a first electrode connected to an input terminal for a high drive voltage, and a second electrode connected to the second electrode of the first forward discharge transistor, and the second forward discharge transistor has a gate electrode connected to a connection node of the first forward discharge transistor and the first forward sub-discharge transistor, a first electrode connected to the input terminal for the high drive voltage, and a second electrode connected to a first electrode of the third forward discharge transistor, and the third forward discharge transistor has a gate electrode connected to an input terminal for the forward clock signal, a first electrode connected to a second electrode of the second forward discharge transistor, and a second electrode connected to the Q-node.

12. The display device according to claim 11, wherein the first backward discharge transistor has a gate electrode and a first electrode connected to an input terminal for a backward low voltage, a second electrode connected to a second electrode of the first backward sub-discharge transistor, the first backward sub-discharge transistor has a gate electrode connected to an input terminal for a backward start signal, a first electrode connected to the input terminal for the high drive voltage, and a second electrode connected to the second electrode of the first backward discharge transistor, and the second backward discharge transistor has a gate electrode connected to a connection node of the first backward discharge transistor and the first backward sub-discharge transistor, a first electrode connected to the input terminal for the high drive voltage, and a second electrode connected to a first electrode of the third forward discharge transistor, and the third backward discharge transistor has a gate electrode connected to the an input terminal for the backward clock signal, a first electrode connected to the second electrode of the second forward discharge transistor, and a second electrode connected to the Q-node.

13. A gate driving circuit comprising:

a pull-up transistor controlled by a voltage level of a Q-node and electrically connected between an input terminal for a low drive voltage and an output terminal for a gate signal;

a pull-down transistor controlled by a voltage level of a QB-node and electrically connected between an input terminal for a high drive voltage and the output terminal for the gate signal;

a first pull-up carry transistor controlled by the voltage level of the Q-node and electrically connected between an input terminal for a forward low drive voltage and an output terminal for a forward carry signal;

a second pull-up carry transistor controlled by the voltage level of the Q-node and electrically connected between an input terminal for a backward low drive voltage and an output terminal for a backward carry signal;

a first pull-down carry transistor controlled by the voltage level of the QB-node and electrically connected between the input terminal for the high drive voltage and the output terminal for the forward carry signal;

a second pull-down carry transistor controlled by the voltage level of the QB-node and electrically connected between the input terminal for the high drive voltage and the output terminal for the backward carry signal; and a Q-node discharging circuit configured to discharge the Q-node in accordance with a forward clock signal when a forward start signal is input at an off level in a forward driving, and discharge the Q-node in accordance with a backward clock signal when a backward start signal is input at an off level in a backward driving, wherein the Q-node discharging circuit comprises:

a first Q-node discharge circuit including a first forward discharge transistor, a first forward sub-discharge transistor, a second forward discharge transistor, and a third forward discharge transistor, and a second Q-node discharge circuit including a first backward discharge transistor, a first backward sub-discharge transistor, a second backward discharge transistor, and a third backward discharge transistor, wherein the forward driving in which a forward low voltage is maintained at a low level and a backward low voltage is maintained at a high level, the first forward discharge transistor is turned on, the first forward sub-discharge transistor is turned off, and the second forward discharge transistor is turned on in response to a period in which the forward start signal is at an off level and a high driving voltage is applied, so that the third forward discharge transistor operates to apply the high driving voltage to the Q-node in accordance with the forward clock signal, and wherein the backward driving in which the forward low voltage is maintained at the high level, the first backward discharge transistor is turned on, the first backward sub-discharge transistor is turned off, and the second backward discharge transistor is turned on in response to a period in which the backward start signal is at an off level, and the high driving voltage is applied, so that the third backward discharge transistor operates to apply the high driving voltage to the Q-node in accordance with the backward clock signal.

14. The gate driving circuit according to claim 13, further comprising:

a clock input circuit comprising a first transistor circuit configured to apply the forward clock signal to the Q-node when a forward start signal is input thereto, and a second transistor circuit configured to apply the backward clock signal to the Q-node when a backward start signal is input thereto.

15. The gate driving circuit according to claim 14, wherein the first transistor circuit of the clock input circuit comprises at least one transistor; and wherein the at least one transistor comprises:

a gate to which the forward start signal is input;

a drain to which the forward clock signal is input; and a source connected to the Q-node.

16. The gate driving circuit according to claim 14, wherein the second transistor circuit of the clock input circuit comprises at least one transistor; and wherein the at least one transistor comprises:

a gate to which the backward start signal is input;

a drain to which the backward clock signal is input; and a source connected to the Q-node.

* * * * *